United States Patent
Flynn et al.

(10) Patent No.: US 7,434,099 B2
(45) Date of Patent: Oct. 7, 2008

(54) SYSTEM AND METHOD FOR INTEGRATING MULTIPLE DATA SOURCES INTO SERVICE-CENTRIC COMPUTER NETWORKING SERVICES DIAGNOSTIC CONCLUSIONS

(75) Inventors: Peter Flynn, Boyds, MD (US); Michael Stoos, Gaithersburg, MD (US); Bill Dentinger, Rockville, MD (US); Tom McBeath, Rockville, MD (US); Dave Rennyson, Rockville, MD (US); David Gellerman, deceased, late of Rockville MD (US); by Robert Gellerman, legal representative, Daytona Beach, FL (US); Jason Collison, Rockville, MD (US); Jo Ramachandron, Rockville, MD (US); Dan Rowland, Rockville, MD (US)

(73) Assignee: Spirent Communications of Rockville, Inc., Rockville, MD (US)

( * ) Notice: Subject to any disclaimer, the term of this patent is extended or adjusted under 35 U.S.C. 154(b) by 0 days.

(21) Appl. No.: 11/156,705

(22) Filed: Jun. 21, 2005

(65) Prior Publication Data
US 2006/0156086 A1    Jul. 13, 2006

Related U.S. Application Data

(60) Provisional application No. 60/641,765, filed on Jan. 7, 2005, provisional application No. 60/580,736, filed on Jun. 21, 2004.

(51) Int. Cl.
G06F 11/00    (2006.01)
(52) U.S. Cl. .......................... 714/26; 714/47
(58) Field of Classification Search .................. 714/26, 714/44; 706/47
See application file for complete search history.

(56) References Cited

U.S. PATENT DOCUMENTS

| | | | |
|---|---|---|---|
| 4,984,174 A * | 1/1991 | Yasunobu et al. | 706/52 |
| 5,159,685 A | 10/1992 | Kung | |
| 5,481,647 A * | 1/1996 | Brody et al. | 706/11 |
| 5,483,637 A | 1/1996 | Winokur et al. | |
| 5,528,516 A | 6/1996 | Yemini et al. | |
| 5,661,668 A | 8/1997 | Yemini et al. | |

(Continued)

FOREIGN PATENT DOCUMENTS

WO        WO 9715009 A1 *    4/1997

*Primary Examiner*—Scott T. Baderman
*Assistant Examiner*—Paul F Contino
(74) *Attorney, Agent, or Firm*—Gilberto M. Villacorta; Phillip J. Articola; Foley & Lardner LLP

(57) ABSTRACT

A system for diagnosing impairments in computer networking services a plurality of connector gateways for interfacing to a plurality of data sources to provide access by the system to computer network data, business-related data, and extra-enterprise environmental data in the plurality of data sources. The system includes a knowledge manager in communication with each of the plurality of connector gateways for analyzing data from the plurality of data sources to generate diagnostic conclusions for resolving the impairments in the computer networking services. The system also includes an interactor in communication with the knowledge manager for generating format information for displaying at least the diagnostic conclusions to a user. The system can include a graphical user interface for displaying at least the diagnostic conclusions associated with edges of an edge model of the computer networking services of the user.

20 Claims, 14 Drawing Sheets

U.S. PATENT DOCUMENTS

| | | | |
|---|---|---|---|
| 5,737,739 A * | 4/1998 | Shirley et al. | 715/512 |
| 6,141,608 A * | 10/2000 | Rother | 701/33 |
| 6,246,787 B1 * | 6/2001 | Hennessey et al. | 382/141 |
| 6,249,755 B1 | 6/2001 | Yemini et al. | |
| 6,421,571 B1 * | 7/2002 | Spriggs et al. | 700/17 |
| 6,529,954 B1 | 3/2003 | Cookmeyer, II et al. | |
| 6,535,795 B1 * | 3/2003 | Schroeder et al. | 700/266 |
| 6,694,362 B1 | 2/2004 | Secor et al. | |
| 6,744,735 B1 | 6/2004 | Nakaguro | |
| 6,745,172 B1 | 6/2004 | Mancisidor et al. | |
| 7,155,514 B1 * | 12/2006 | Milford | 709/225 |
| 2003/0097588 A1 | 5/2003 | Fischman et al. | |
| 2003/0204370 A1 | 10/2003 | Yemini et al. | |
| 2004/0249720 A1 * | 12/2004 | Wookey et al. | 705/26 |
| 2005/0021294 A1 * | 1/2005 | Trsar et al. | 702/183 |

\* cited by examiner

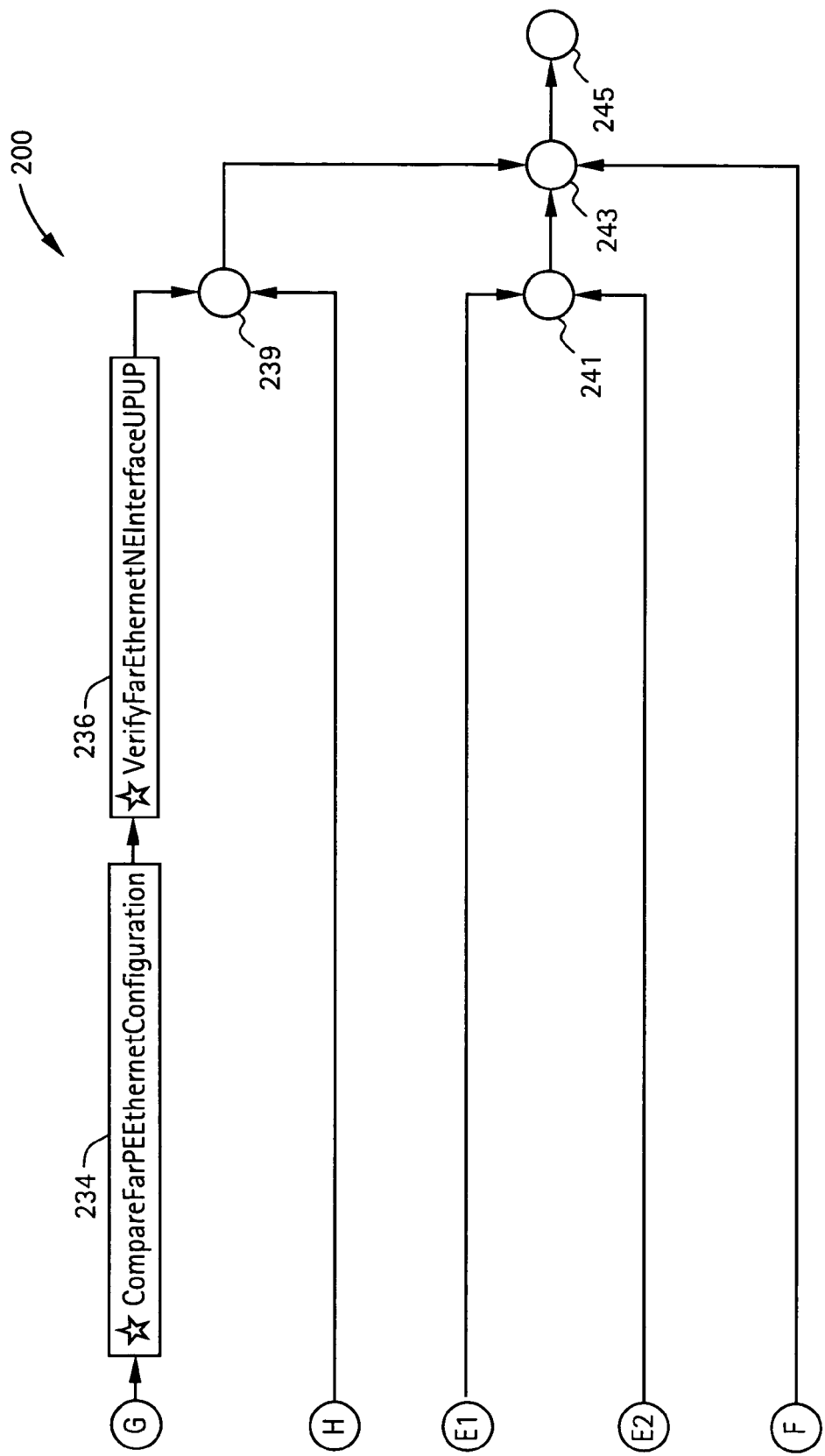

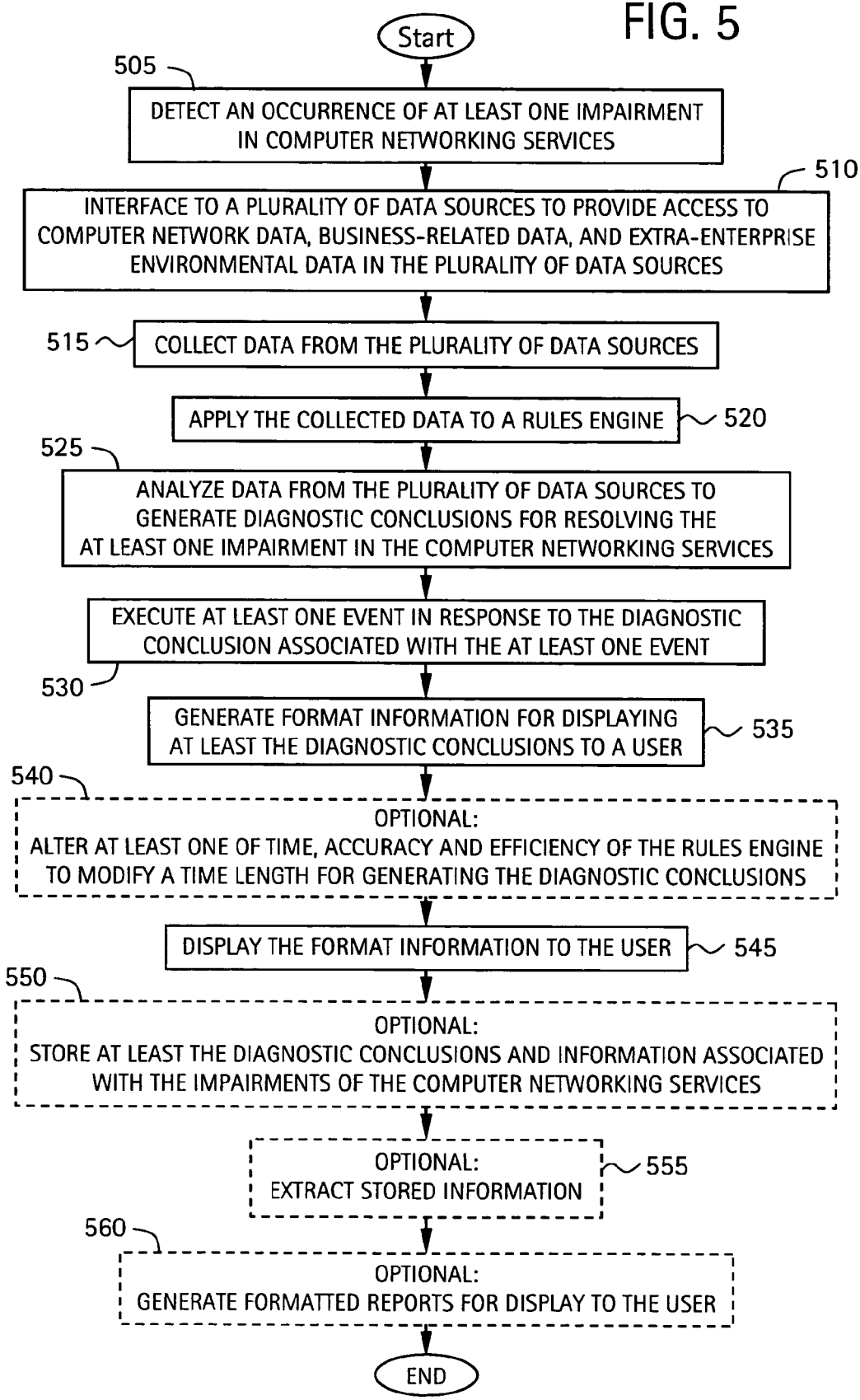

SYSTEM AND METHOD FOR INTEGRATING MULTIPLE DATA SOURCES INTO SERVICE-CENTRIC COMPUTER NETWORKING SERVICES DIAGNOSTIC CONCLUSIONS

This application claims priority under 35 U.S.C. § 119(e) to U.S. Provisional Application Ser. No. 60/580,736, filed Jun. 21, 2004, and U.S. Provisional Application Ser. No. 60/641,765, filed Jan. 7, 2005, the entire contents of each of which are incorporated by reference herein.

BACKGROUND

1. Field of the Invention

The present invention relates to computer and telecommunication network monitoring and management systems. More particularly, the present invention relates to a system and method for integrating multiple data sources into service-centric computer networking services diagnostic conclusions.

2. Background Information

Computer networks and the services they provide can generate numerous errors, faults, and other like events, the majority of which require different messages to be sent to the user and the occurrence and performance of many different complex actions for recovery. These events result from a variety of conditions, including configuration errors, hardware errors, communication errors, and the like.

Fault analysis and problem resolution is often handled manually by, for example, network administrators. Such administrators must understand the entire infrastructure of the network, the information technology (IT) resources that support it, and how the network and resources work together to deliver services. Incoming events must be continuously sifted through to detect those affecting the ability of an enterprise to sustain service levels. One problem with this approach is that an event can generate error or fault messages that often contain vague or incomplete information. The administrator must then decipher the message or perform additional work to determine the actual cause of the problem. Another difficulty with manual fault resolution is that one event can often generate multiple error or fault messages. Therefore, the administrator is often overwhelmed by the number of errors or faults and the accompanying computer network data that need to be analyzed. Furthermore, the analysis and review of such errors, faults and other computer network data is knowledge intensive, sometimes requiring information from sources not readily available to the administrator that could assist in analyzing the impact of network faults on services, business units and customers.

Some attempts have been made to implement fault analysis managers. However, these attempts have been unsuccessful due to the large amount of information that must be stored and the expert knowledge required. In some cases, fault analysis managers have been implemented with complicated software code that is called after an event is recognized. Other implementations have used "table driven" fault management. However, since each event can have many action codes and each unique error event/action code pair must be represented, these systems were inefficient in representation and storage. Furthermore, none of the methods integrate data from disparate sources that can be used to help pinpoint the probable cause of real or potential service delivery problems and present solutions for resolving them quickly.

SUMMARY OF THE INVENTION

A system and method are disclosed for integrating multiple data sources into service-centric computer networking services diagnostic conclusions. In accordance with exemplary embodiments of the present invention, according to a first aspect, a system for diagnosing impairments in computer networking services includes a plurality of connector gateways. The plurality of connector gateways are configured to interface to a plurality of data sources to provide access by the system to computer network data, business-related data, and extra-enterprise environmental data in the plurality of data sources. The system includes a knowledge manager in communication with each of the plurality of connector gateways. The knowledge manner is configured to analyze data from the plurality of data sources to generate diagnostic conclusions for resolving the impairments in the computer networking services. The system includes an interactor in communication with the knowledge manager. The interactor is configured to generate format information for displaying at least the diagnostic conclusions to a user.

According to the first aspect, each of the plurality of connector gateways can be associated with one of the plurality of data sources. The knowledge manager can comprise a rules engine. The knowledge manager can comprise at least one diagnostic assistant. The at least one diagnostic assistant can be configured to collect data from the plurality of data sources via the plurality of connector gateways and to apply the collected data to the rules engine to generate the diagnostic conclusions. The rules engine can be configured to adapt to the computer networking services using the diagnostic conclusions. The user can alter at least one of time, accuracy and efficiency of the rules engine to modify a time length for generating the diagnostic conclusions by the knowledge manager.

According to the first aspect, the diagnostic conclusions can comprise recommended actions for correcting the impairments in the computer networking services. The diagnostic conclusions can comprise a severity weighting factor for ranking the diagnostic conclusions. The diagnostic conclusions can comprise impairment information on the impairments in the computer networking services. The impairment information comprises locations of the impairments in the computer networking services. At least one event can be associated with a diagnostic conclusion. The at least one event can be configured to execute in response to the diagnostic conclusion. The at least one event can comprise additional diagnostics of the computer networking services by the system. The at least one event can comprise an automatic repair of the computer networking services to correct the impairments.

According to the first aspect, the system can include a display. The display can be configured to represent the format information from the interactor. The system can include a graphical user interface. The graphical user interface can be configured to display the format information from the interactor to the user. The graphical user interface can be configured to display at least one of iconic and hierarchical representations of diagnostic conclusions to the user. The graphical user interface can be configured to display at least one of iconic and hierarchical representations of diagnostic information and computer networking services information to the user. The graphical user interface can be configured to display at least one of iconic and hierarchical representations of active diagnostic assistants to the user. The graphical user interface can be configured to display the computer networking services to the user from a service-centric perspective based on computer networking services of the user.

According to the first aspect, the system can include at least one archival database in communication with the knowledge manager. The at least one archival database can be configured to store at least the diagnostic conclusions and information associated with the impairments of the computer networking services. The system can include a diagnostic report generator in communication with the at least one archival database and the interactor. The diagnostic report generator can be configured to extract stored information from the at least one archival database and to generate formatted reports from the extracted information for display to the user. The knowledge manager can be associated with a computer networking services domain. The interactor can be in communication with at least one of the plurality of connector gateways.

According to the first aspect, the computer network data can comprise data from computer network test sources. The computer network test sources can comprise computer network probes. The computer network data can comprise data from fault analysis support systems. The business-related data can comprise data from customer records databases. The business-related data can comprise data from computer networking services databases. The business-related data can comprise data from network inventory databases. The extra-enterprise environmental data can comprise news data associated with current events. The extra-enterprise environmental data can comprise weather data.

According to a second aspect of the present invention, a system for diagnosing impairments in computer networking services includes a plurality of connector interface modules for connecting to a plurality of data sources to provide access by the system to computer network data, business-related data, and extra-enterprise environmental data in the plurality of data sources. The system includes a knowledge manager module in communication with each of the plurality of connector interface modules for analyzing data from the plurality of data sources to generate computer networking services diagnostic conclusions for correcting the impairments in the computer networking services. The knowledge manager module includes an interactor module for generating format information for displaying at least the computer networking services diagnostic conclusions to a user and for processing input from the user. The knowledge manager module includes a rules engine module. The knowledge manager module also includes at least one diagnostic assistant module for collecting data from the plurality of data sources via the plurality of connector interface modules and applying the collected data to the rules engine module to generate the computer networking services diagnostic conclusions. The system includes a graphical user interface in communication with the interactor module of the knowledge manager module for displaying the format information to the user and for receiving the input from the user.

According to the second aspect, the computer networking services diagnostic conclusions can comprise at least recommended actions for correcting the impairments in the computer networking services, severity factors for weighting the computer networking services diagnostic conclusions, and impairment information on the impairments in the computer networking services. The system can include at least one archival database in communication with the knowledge manager module. The system can include a diagnostic report generator module in communication with the interactor module of the knowledge manager module for generating formatted reports for display to the user. The computer network data can comprise data from computer network test sources. The business-related data can comprise data from computer networking services databases. The extra-enterprise environmental data can comprise weather data.

According to a third aspect of the present invention, a method of diagnosing impairments in computer networking services includes the steps of: i.) detecting an occurrence of at least one impairment in the computer networking services; ii.) interfacing to a plurality of data sources to provide access to computer network data, business-related data, and extra-enterprise environmental data in the plurality of data sources; iii.) analyzing data from the plurality of data sources to generate diagnostic conclusions for resolving the at least one impairment in the computer networking services; and iv.) generating format information for displaying at least the diagnostic conclusions to a user.

According to the third aspect, the step of analyzing can include the steps of: v.) collecting data from the plurality of data sources; and vi.) applying the collected data to a rules engine to generate the diagnostic conclusions. The method can comprise the step of: vii.) altering at least one of time, accuracy and efficiency of the rules engine to modify a time length for generating the diagnostic conclusions. The diagnostic conclusions can comprise recommended actions for correcting the impairments in the computer networking services. The diagnostic conclusions can comprise a severity weighting factor for ranking the diagnostic conclusions. The diagnostic conclusions can comprise impairment information on the impairments in the computer networking services. The impairment information can comprise locations of the impairments in the computer networking services. At least one event can be associated with a diagnostic conclusion. The method can further include the step of: viii.) executing the at least one event in response to the diagnostic conclusion associated with the at least one event. The at least one event can comprise additional diagnostics of the computer networking services. The at least one event can comprise an automatic repair of the computer networking services to correct the impairments.

According to the third aspect, the method can include the step of: ix.) displaying the format information to the user. The step of displaying can include the steps of: x.) displaying at least one of iconic and hierarchical representations of diagnostic conclusions to the user; xi.) displaying at least one of iconic and hierarchical representations of diagnostic information and computer networking services information to the user; and xii.) displaying the computer networking services to the user from a service-centric perspective based on computer networking services of the user. The method can include the steps of: xiii.) storing at least the diagnostic conclusions and information associated with the impairments of the computer networking services; xiv.) extracting stored information; and xv.) generating formatted reports from the extracted information for display to the user. The computer network data can comprise data from computer network test sources. The business-related data can comprise data from customer records databases. The business-related data can comprise data from computer networking services databases. The extra-enterprise environmental data can comprise news data associated with current events. The extra-enterprise environmental data can comprise weather data.

According to a fourth aspect of the present invention, a computer-readable medium contains a computer program for diagnosing impairments in computer networking services. The computer program performs the steps of: i.) receiving a detection of an occurrence of at least one impairment in the computer networking services; ii.) accessing a plurality of data sources to collect computer network data, business-related data, and extra-enterprise environmental data from the plurality of data sources; iii.) analyzing data from the plurality of data sources to generate diagnostic conclusions for resolving the at least one impairment in the computer networking services; and iv.) generating format information for displaying at least the diagnostic conclusions to a user.

According to the fourth aspect, the computer program can perform the steps of: v.) applying the collected data to a rules engine to generate the diagnostic conclusions; and vi.) receiving an alteration of at least one of time, accuracy and efficiency of the rules engine to modify a time length for generating the diagnostic conclusions. The diagnostic conclusions can comprise recommended actions for correcting the impairments in the computer networking services. The diagnostic conclusions can comprise a severity weighting factor for ranking the diagnostic conclusions. The diagnostic conclusions can comprise impairment information on the impairments in the computer networking services. The impairment information can comprise locations of the impairments in the computer networking services. At least one event can be associated with a diagnostic conclusion. The computer program can perform the step of: vii.) executing the at least one event in response to the diagnostic conclusion associated with the at least one event. The at least one event can comprise additional diagnostics of the computer networking services. The at least one event can comprise an automatic repair of the computer networking services to correct the impairments.

According to the fourth aspect, the computer program can perform the steps of: viii.) displaying the format information to the user; ix.) displaying at least one of iconic and hierarchical representations of diagnostic conclusions to the user; x.) displaying at least one of iconic and hierarchical representations of diagnostic information and computer networking services information to the user; xi.) displaying the computer networking services to the user from a service-centric perspective based on computer networking services of the user; xii.) storing at least the diagnostic conclusions and information associated with the impairments of the computer networking services; xiii.) extracting stored information; and xiv.) generating formatted reports from the extracted information for display to the user. The computer network data can comprise data from computer network test sources. The business-related data can comprise data from customer records databases. The business-related data can comprise data from computer networking services databases. The extra-enterprise environmental data can comprise news data associated with current events. The extra-enterprise environmental data can comprise weather data.

According to a fifth aspect of the present invention, a system for diagnosing impairments in computer networking services includes a plurality of means for interfacing to a plurality of data sources. The plurality of interfacing means provides access by the system to computer network data, business-related data, and extra-enterprise environmental data in the plurality of data sources. The system includes means for managing a knowledge base in communication with each of the plurality of interfacing means. The knowledge base managing means is configured to analyze data from the plurality of data sources to generate diagnostic conclusions for resolving the impairments in the computer networking services. The system includes means for interacting in communication with the knowledge base managing means. The interacting means is configured to generate format information for displaying at least the diagnostic conclusions to a user.

According to the fifth aspect, each of the plurality of interfacing means can be associated with one of the plurality of data sources. The knowledge base managing means can comprise a rules engine means. The knowledge base managing means can comprise at least one diagnostic assistant means. The at least one diagnostic assistant means can be configured to collect data from the plurality of data sources via the plurality of interfacing means and to apply the collected data to the rules engine means to generate the diagnostic conclusions. The rules engine means can be configured to adapt to the computer networking services using the diagnostic conclusions. The user can alter at least one of time, accuracy and efficiency of the rules engine means to modify a time length for generating the diagnostic conclusions by the knowledge base managing means. The diagnostic conclusions can comprise recommended actions for correcting the impairments in the computer networking services. The diagnostic conclusions can comprise a severity weighting factor for ranking the diagnostic conclusions. The diagnostic conclusions can comprise impairment information on the impairments in the computer networking services. The impairment information can comprise locations of the impairments in the computer networking services. At least one event can be associated with a diagnostic conclusion. The at least one event can be configured to execute in response to the diagnostic conclusion. The at least one event can comprise additional diagnostics of the computer networking services by the system. The at least one event can comprise an automatic repair of the computer networking services to correct the impairments.

According to the fifth aspect, the system can include means for representing the format information from the interacting means. The system can include a graphical user interface means. The graphical user interface means can be configured to display the format information from the interacting means to the user. The graphical user interface means can be configured to display at least one of iconic and hierarchical representations of diagnostic conclusions to the user. The graphical user interface means can be configured to display at least one of iconic and hierarchical representations of diagnostic information and computer networking services information to the user. The graphical user interface means can be configured to display at least one of iconic and hierarchical representations of active diagnostic assistants to the user. The graphical user interface means can be configured to display the computer networking services to the user from a service-centric perspective based on computer networking services of the user.

According to the fifth aspect, the system can include at least one means for storing information in communication with the knowledge base managing means. The at least one storing means can be configured to store at least the diagnostic conclusions and information associated with the impairments of the computer networking services. The system can include means for generating a report in communication with the at least one storing means and the interacting means. The report generating means can be configured to extract stored information from the at least one storing means and to generate formatted reports from the extracted information for display to the user. The knowledge base manager means can be associated with a computer networking services domain. The interacting means can be in communication with at least one of the plurality of interfacing means.

According to the fifth aspect, the computer network data can comprise data from computer network test sources. The computer network test sources can comprise computer network probes. The computer network data can comprise data from fault analysis support systems. The business-related data can comprise data from customer records databases. The business-related data can comprise data from computer networking services databases. The business-related data can comprise data from network inventory databases. The extra-enterprise environmental data can comprise news data associated with current events. The extra-enterprise environmental data can comprise weather data.

According to a sixth aspect of the present invention, a system for diagnosing impairments in computer networking services includes a plurality of means for connecting to a plurality of data sources to provide access by the system to computer network data, business-related data, and extra-enterprise environmental data in the plurality of data sources. The system includes a knowledge manager means in communication with each of the plurality of connecting means for analyzing data from the plurality of data sources to generate computer networking services diagnostic conclusions for correcting the impairments in the computer networking services. The knowledge manager means includes an interactor means for generating format information for displaying at least the computer networking services diagnostic conclusions to a user and for processing input from the user. The knowledge manager means includes a rules engine means and at least one diagnostic assistant means for collecting data from the plurality of data sources via the plurality of connector interface modules and applying the collected data to the rules engine means to generate the computer networking services diagnostic conclusions. The system includes a graphical user interface means in communication with the interactor means of the knowledge manager means for displaying the format information to the user and for receiving the input from the user.

According to the sixth aspect, the computer networking services diagnostic conclusions can comprise at least recommended actions for correcting the impairments in the computer networking services, severity factors for weighting the computer networking services diagnostic conclusions, and impairment information on the impairments in the computer networking services. The system can include at least one means for storing information in communication with the knowledge manager module. The system can include a diagnostic report generator means in communication with the interactor means of the knowledge manager means for generating formatted reports for display to the user. The computer network data can comprise data from computer network test sources. The business-related data comprises data from computer networking services databases. The extra-enterprise environmental data comprises weather data.

According to a seventh aspect of the present invention, a system for diagnosing impairments in computer networking services includes a memory that stores steps of a computer program to: i.) receive a detection of an occurrence of at least one impairment in the computer networking services; ii.) access a plurality of data sources to collect computer network data, business-related data, and extra-enterprise environmental data from the plurality of data sources; iii.) analyze data from the plurality of data sources to generate diagnostic conclusions for resolving the at least one impairment in the computer networking services; and iv.) generate format information for displaying at least the diagnostic conclusions to a user. The system includes a processor for accessing the memory to execute the steps.

According to a eighth aspect of the present invention, a system for diagnosing impairments in computer networking services includes a plurality of connector gateways. The plurality of connector gateways are configured to interface to a plurality of data sources to provide access by the system to computer network data, business-related data, and extra-enterprise environmental data in the plurality of data sources. The system includes a knowledge manager in communication with each of the plurality of connector gateways. The knowledge manager is configured to analyze data from the plurality of data sources to generate diagnostic conclusions for resolving the impairments in the computer networking services. The system includes a graphical user interface in communication with the knowledge manager. The graphical user interface is configured to display at least the diagnostic conclusions associated with edges of an edge model of the computer networking services of a user.

According to the eighth aspect, the system can include an interactor in communication between the knowledge manager and the graphical user interface. The interactor is configured to generate format information for displaying at least the diagnostic conclusions associated with the edges of the edge model of the computer networking services of the user. The system can include a display for displaying the graphical user interface. According to an exemplary embodiment of the eighth aspect, the edge model can comprise an Internet Protocol (IP) edge model. An edge of the IP edge model can comprise one of a local customer edge, a remote provider edge, a remote customer edge, and an internet service provider (ISP) edge. The edge model can comprise a voice over internet protocol (VoIP) edge model. An edge of the VoIP edge model can comprise one of a local phone edge, a VoIP proxy edge, a SS7 gateway edge and an ISDN gateway edge. The edge model can comprise a transport edge model. An edge of the transport edge model can comprise one of a VLAN edge, an ATM edge, a DSL edge and a Martini edge. The knowledge manager can comprise a rules engine. Each edge can be associated with a rules set of the rules engine. The knowledge manager can comprise at least one diagnostic assistant. The at least one diagnostic assistant can be configured to collect data from the plurality of data sources via the plurality of connector gateways and to apply the collected data to the rules engine to generate the diagnostic conclusions associated with the edges of the edge model of the computer networking services.

According to a ninth aspect of the present invention, a method of diagnosing impairments in computer networking services includes the steps of: a.) detecting an occurrence of at least one impairment in the computer networking services; b.) interfacing to a plurality of data sources to provide access to computer network data, business-related data, and extra-enterprise environmental data in the plurality of data sources; c.) analyzing data from the plurality of data sources to generate diagnostic conclusions for resolving the at least one impairment in the computer networking services; and d.) displaying at least the diagnostic conclusions associated with edges of an edge model of the computer networking services of a user.

According to the ninth aspect, the can include the step of: e.) generating format information for displaying at least the diagnostic conclusions associated with the edges of the edge model of the computer networking services of the user. According to an exemplary embodiment of the ninth aspect, the edge model can comprise an IP edge model. An edge of the IP edge model can comprise one of a local customer edge, a remote provider edge, a remote customer edge, and an ISP edge. The edge model can comprise a VoIP edge model. An edge of the VoIP edge model can comprise one of a local phone edge, a VoIP proxy edge, a SS7 gateway edge and an ISDN gateway edge. The edge model can comprise a transport edge model. An edge of the transport edge model can comprise one of a VLAN edge, an ATM edge, a DSL edge and a Martini edge. The method can include the steps of: f.) collecting data from the plurality of data sources; and g.) applying the collected data to a rules engine to generate the diagnostic conclusions associated with the edges of the edge model of the computer networking services.

According to a tenth aspect of the present invention, a computer-readable medium contains a computer program for diagnosing impairments in computer networking services, wherein the computer program performs the steps of: a.) receiving a detection of an occurrence of at least one impairment in the computer networking services; b.) accessing a plurality of data sources to collect computer network data, business-related data, and extra-enterprise environmental data from the plurality of data sources; c.) analyzing data from the plurality of data sources to generate diagnostic conclusions for resolving the at least one impairment in the computer networking services; and d.) displaying at least the diagnostic conclusions associated with edges of an edge model of the computer networking services of a user.

According to the tenth aspect, the computer program can perform the step of: e.) generating format information for displaying at least the diagnostic conclusions associated with the edges of the edge model of the computer networking services of the user. According to an exemplary embodiment of the tenth aspect, the edge model can comprise an IP edge model. An edge of the IP edge model can comprise one of a local customer edge, a remote provider edge, a remote customer edge, and an internet service provider (ISP) edge. The edge model can comprise a VoIP edge model. An edge of the VoIP edge model can comprise one of a local phone edge, a VoIP proxy edge, a SS7 gateway edge and an ISDN gateway edge. The edge model can comprise a transport edge model. An edge of the transport edge model can comprise one of a VLAN edge, an ATM edge, a DSL edge and a Martini edge. The computer program can perform the step of: f.) applying the collected data to a rules engine to generate the diagnostic conclusions associated with the edges of the edge model of the computer networking services.

According to an eleventh aspect of the present invention, a system for displaying a graphical user interface for diagnosing impairments in computer networking services includes an IP edge module configured to display diagnostic conclusions associated with edges of an IP edge model of the computer networking services. The system includes a VoIP edge module configured to display diagnostic conclusions associated with edges of a VoIP edge model of the computer networking services. The system includes a transport edge module configured to display diagnostic conclusions associated with edges of a transport edge model of the computer networking services.

According to the eleventh aspect, the system can include a plurality of connector gateways. The plurality of connector gateways can be configured to interface to a plurality of data sources to provide access by the system to computer network data, business-related data, and extra-enterprise environmental data in the plurality of data sources. The system can include a knowledge manager in communication with each of the plurality of connector gateways. The knowledge manner can be configured to analyze data from the plurality of data sources to generate diagnostic conclusions for resolving the impairments in the computer networking services. The system can include an interactor in communication between the knowledge manager and the edge modules. The interactor can be configured to generate format information for displaying at least the diagnostic conclusions associated with the edges of the edge models of the computer networking services. The system can include a display for displaying the graphical user interface.

According to the eleventh aspect, an edge of the IP edge model can comprise one of a local customer edge, a remote provider edge, a remote customer edge, and an internet service provider (ISP) edge. An edge of the VoIP edge model can comprise one of a local phone edge, a VoIP proxy edge, a SS7 gateway edge and an ISDN gateway edge. An edge of the transport edge model can comprise one of a VLAN edge, an ATM edge, a DSL edge and a Martini edge. The knowledge manager can comprise a rules engine. Each edge can be associated with a rules set of the rules engine. The knowledge manager can comprise at least one diagnostic assistant. The at least one diagnostic assistant can be configured to collect data from the plurality of data sources via the plurality of connector gateways and to apply the collected data to the rules engine to generate the diagnostic conclusions associated with the edges of the edge models of the computer networking services.

According to a twelfth aspect of the present invention, a system for diagnosing impairments in computer networking services includes means for detecting an occurrence of at least one impairment in the computer networking services. The system includes means for interfacing to a plurality of data sources to provide access to computer network data, business-related data, and extra-enterprise environmental data in the plurality of data sources. The system includes means for analyzing data from the plurality of data sources to generate diagnostic conclusions for resolving the at least one impairment in the computer networking services. The system includes means for displaying at least the diagnostic conclusions associated with edges of an edge model of the computer networking services of a user.

According to the twelfth aspect, the system can include means for generating format information for displaying at least the diagnostic conclusions associated with the edges of the edge model of the computer networking services of the user. According to an exemplary embodiment of the twelfth aspect, the edge model can comprise an Internet Protocol (IP) edge model. An edge of the IP edge model can comprise one of a local customer edge, a remote provider edge, a remote customer edge, and an internet service provider (ISP) edge. The edge model can comprise a voice over internet protocol (VoIP) edge model. An edge of the VoIP edge model can comprise one of a local phone edge, a VoIP proxy edge, a SS7 gateway edge and an ISDN gateway edge. The edge model can comprise a transport edge model. An edge of the transport edge model can comprise one of a VLAN edge, an ATM edge, a DSL edge and a Martini edge. The system can include means for collecting data from the plurality of data sources, and means for applying the collected data to a rules engine to generate the diagnostic conclusions associated with the edges of the edge model of the computer networking services.

BRIEF DESCRIPTION OF THE DRAWINGS

Other objects and advantages of the present invention will become apparent to those skilled in the art upon reading the following detailed description of preferred embodiments, in conjunction with the accompanying drawings, wherein like reference numerals have been used to designate like elements, and wherein:

FIGS. 2A, 2B and 2C are an illustration of logic flows in a logic tree for generating diagnostic conclusions, in accordance with an exemplary embodiment of the present invention.

FIG. 5 is a flowchart illustrating steps for diagnosing impairments in computer networking services, in accordance with an exemplary embodiment of the present invention.

DETAILED DESCRIPTION OF THE PREFERRED EMBODIMENTS

Exemplary embodiments of the present invention are directed to a system and method for integrating multiple data sources into service-centric computer networking services diagnostic conclusions. According to exemplary embodiments, the system includes a plurality of connector gateways. The connector gateways interface to a plurality of data sources to provide access by the system to the data sources. The plurality of data sources include computer network data sources, business-related data sources, extra-enterprise environmental data sources and other disparate data sources from which information can be collected and used to present a comprehensive, service-centric perspective of the computer networking services to a user. The system includes a knowledge manager in communication with each of the plurality of connector gateways. The knowledge manager retrieves information from the plurality of data sources via the connector gateways and analyzes the collected data to generate diagnostic conclusions for resolving the impairments in the computer networking services. These diagnostic conclusions can provide explicit feedback to the user intended to direct them to a course of action that will correct the impairment(s). The system also includes an interactor in communication with the knowledge manager. The interactor generates format information that can be used to display, for example, the diagnostic conclusions to a user via a graphical user interface.

Figure 1:
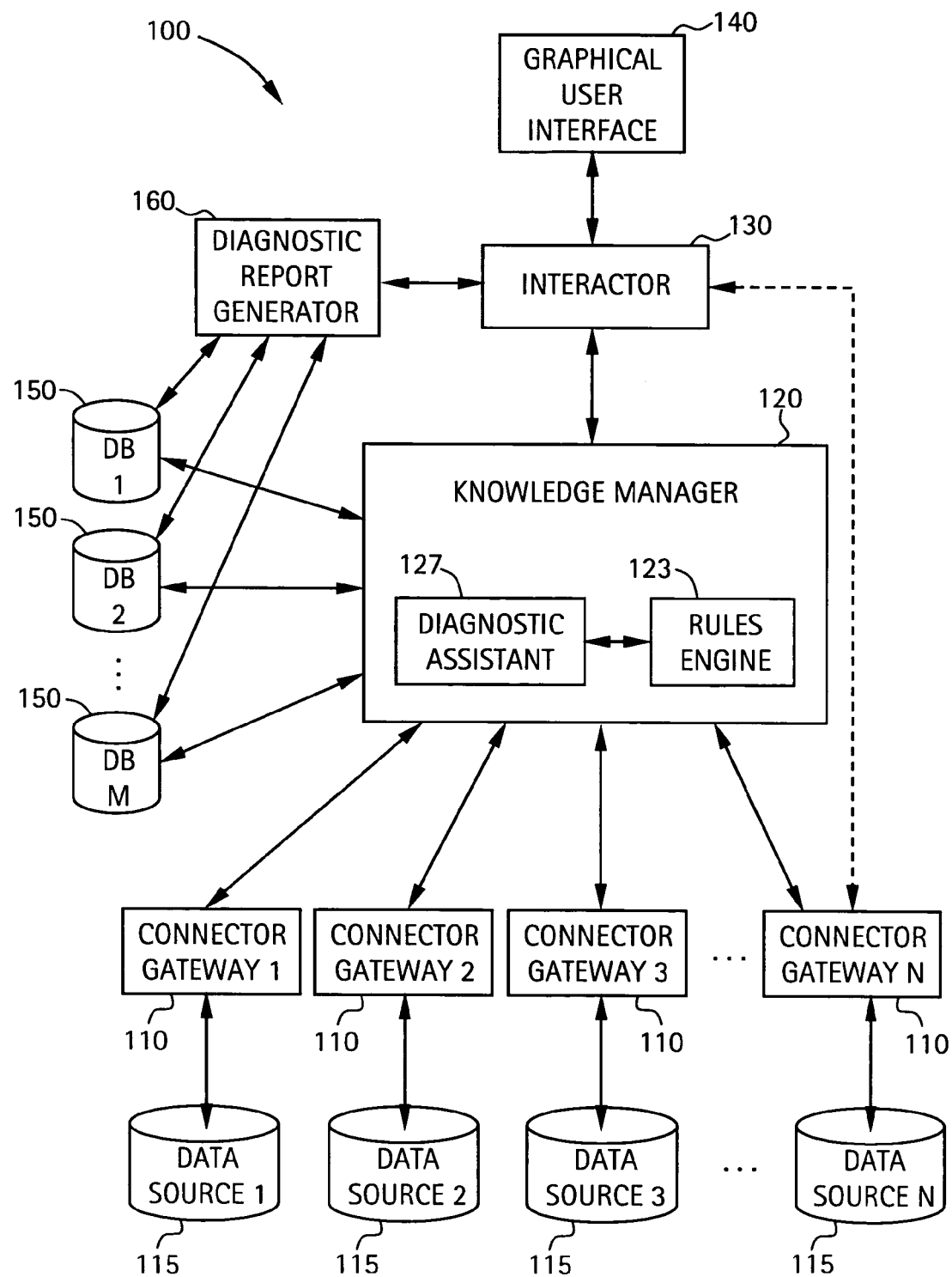
FIG. 1 is a diagram illustrating a system for diagnosing impairments in computer networking services, in accordance with an exemplary embodiment of the present invention.

These and other aspects of the present invention will now be described in greater detail. FIG. 1 is a diagram illustrating a system 100 for diagnosing impairments in computer networking services, in accordance with an exemplary embodiment of the present invention. As used herein, "computer networking services" includes any suitable type of computer network (e.g., Local Area Networks (LANs), Wide Area Networks (WANs) or the like) and any suitable type of computer services of a customer that can run on and can be deployed over the computer network. As used herein, "impairments" in the computer networking services include any suitable type of faults, errors, problems and/or deficiencies that can occur in the computer network, including, for example, both hardware and software failures in the computer network, sub-optimal performance of any aspect of the computer network, configuration errors, communication faults and the like. Additionally, "impairments" in the computer networking services include any appropriate type of faults, errors, problems and/or deficiencies that can occur in computer services running on the computer network, including, for example, service level agreement (SLA) violations, sub-optimal performance of the computer services or any other suitable fault, problem or deficiency.

The system 100 includes a plurality of connector gateways 110. The system 100 can include any suitable number of connector gateways 110. The system 100 also includes a plurality of data sources 115. According to an exemplary embodiment, each of the plurality of connector gateways 110 can be associated with one of the plurality of data sources 115. Thus, the system 100 can include any suitable number of data sources 115. The plurality of connector gateways 110 are configured to interface to the plurality of data sources 115 to provide access by the system 100 to computer network data, business-related data, and extra-enterprise environmental data in the plurality of data sources 115.

As used herein, "computer network data" includes any data associated with a computer network that provides status, topology, performance, fault and other like information regarding the computer network. For purposes of illustration and not limitation, the computer network data can include data from computer network test sources, such as, for example, computer network probes (both hardware and software probes), data from fault analysis support systems, data from performance monitoring/management systems, data from network elements located in the computer network, data from third-party diagnostic appliances, or any other suitable computer network data. The connector gateways 110 interfaced to these computer network data sources thereby provide access by the system 100 to the computer network, events occurring on the computer network and any suitable information associated with the computer network that can be used for managing the computer network.

As used herein, "business-related data" includes any data associated with a business, business practices, customers, inventory, business infrastructure and other corporate knowledge. For purposes of illustration and not limitation, the business-related data can include data from customer circuit/records databases or other customer relationship management systems, data from computer networking services databases, data from change management systems, data from ticketing, provisioning or other accounting or billing databases, data from network inventory databases, data from authentication and authorization systems, and other like information that is associated with the computer networking services of a business or enterprise.

In addition, as used herein, "extra-enterprise environmental data" includes any data that is external to a business, its business-related data and associated computer network data, but can have an affect or other impact on the computer networking services. In other words, the extra-enterprise environmental data comprises information regarding the environment or surroundings in which the business and the computer networking services operate. According to exemplary embodiments, the extra-enterprise environmental data can include news data associated with current events, weather data, and the like. For purposes of illustration and not limitation, the news data can comprise news of a union strike, as this information can be used to determine the time to repair outages in a computer network that is serviced by those (now striking) workers. For example, the weather data can comprise information regarding a large storm moving through an area, as this information can be used to determine the cause of outages in a computer network.

The plurality of connector gateways 110 are software interfaces that are used to access the plurality of data sources 115. The plurality of data sources 115 can include, for example, network element test sources, such as test operational support systems (OSSs) or other test management utilities that support the ability to run tests at various network layers. In addition, the plurality of data sources 115 can include archival sources, such as relational databases developed by Sybase Inc., Oracle Inc. or the like. The data sources 115 can also include data sources accessed by the LDAP protocol, NMS/EMS systems, fault management/performance monitoring and management systems (e.g., the MicroMuse NETCOOL™ family of products and the like), streaming data from sources located on the Internet (e.g., news streams from sources such as CNN and the like), data stored in HTML or ASCII text format, or any other suitable data. In other words, the connector gateways 110 allow access to any suitable type of data sources that can provide the computer network data, business-related data, and extra-enterprise environmental data that can be used by the system 100 in diagnosing the impairments in the computer networking services. Those of ordinary skill in the art of computer programming will recognize that the implementation of each of the connector gateways 110 will depend on the nature and type of data source 115 to which respective connector gateway 110 will interface. According to an exemplary embodiment, the connector gateways 110 can be implemented using XML or any suitable type of communication/information interface.

The connector gateways 110 provide an abstract data layer that removes the need to learn any of the multiple query formats needed to access these different data sources 115 by system 100. The connector gateways 110 render differences in the data sources 115 invisible to the administrator and the system 100 by handling the different methods needed to access the underlying data and returning the data in a format understandable by the system 100. For example, the connector gateways 110 can be configured to normalize or otherwise transform the data from the plurality of data sources into a uniform format usable by the knowledge manager 120. Thus, the system 100 is extensible to other data sources 115 by adding appropriate connector gateways 110 to access the data from those additional sources. According to an exemplary embodiment, the connector gateways 110 can be configured to cache data locally that has been retrieved from the data sources 115 to improve performance of the system 100. For example, data that is accessed regularly or repeatedly can be cached locally within the appropriate connector gateway(s) 110 (or memory associated with the connector gateway(s) 110) for use by the system 100, so as to alleviate the necessity of performing numerous queries to the respective data source(s) 115 for this frequently-used data. However, according to exemplary embodiments, any data collected from the plurality of data sources 115 can be cached or stored by any of the components of the system 100 using any appropriate type of computer storage medium, for example, to improve performance of the system 100. The caching or storage of data collected from the data sources 115 by the system 100 is referred to herein as the "temporal persistence" of such data.

The system 100 includes a knowledge manager 120 in communication with each of the plurality of connector gateways 110. According to exemplary embodiments, the knowledge manager 120 is configured to analyze data from the plurality of data sources 115 to generate diagnostic conclusions for resolving the impairments in the computer networking services. As used herein, a "diagnostic conclusion" is information that is used for interpreting the data that is collected from the plurality of data sources 115 and for providing explicit feedback intended to direct a user or entity to a course of action that will resolve or otherwise correct the impairments in the computer networking services.

According to exemplary embodiments, the knowledge manager 120 can be associated with a computer networking services domain. For example, one knowledge manager 120 can be associated with basic Internet Protocol (IP) services, another knowledge manager 120 can be associated with Voice over IP (VoIP) services, while another can be associated with IP/VPN services, and the like. Thus, the system 100 can include one or more knowledge managers 120, with a knowledge manager 120 configured to handle multiple such domains or a single such domain. For example, a plurality of knowledge managers 120 can be distributed over the computer network and communicate with each other (using any suitable type of communication or network protocol) to provide distributed and parallel processing of the information collected from the various data sources 115 to, for example, improve performance of the system 100. According to an exemplary embodiment, the knowledge manager 120 can interface to the plurality of connector gateways 110 using a XML interface or other suitable communication/information interface capable of communicating such information.

The knowledge manager 120 includes a rules engine 123. The rules engine 123 can be a third-party tool (e.g., the FAIR ISAAC™ Blaze Advisor or the like) that provides the execution environment framework for the knowledge manager 120. However, the rules engine 123 can be comprised of any suitable type and combination of expert knowledge bases, neural networks, Bayesian logic, fuzzy logic, artificial intelligence, scripting language or the like that is capable of analyzing or can be used to analyze data from the plurality of data sources 115 and to provide diagnostic conclusions for resolving the impairments in the computer networking services. The knowledge manager 120 can include any number of rules engines 123, which can be located locally or distributed remotely over the computer network to provide for distributed and parallel processing. The rules engine 123 comprises logic flows and rules that analyze the data collected from the data sources 115 and uses the results of that analysis to traverse a logic tree of possible diagnostic conclusions.

According to an exemplary embodiment, each computer networking services domain can have one or more "base" or "core" rules engines 123 associated with it, and one or more "extended" and "custom" rules engines 123. A core rules engine 123 provides the basic (minimal) required functions for a given domain. An extended rules engine 123 defines value-added feature sets for a particular domain. These value-added features can be migrated in the core rules engine 123 over time, and new value-added features added to the extended rules engine 123. A custom rules engine 123 provides value-added features specific to a particular customer. For example, in contrast to the core and extended rules engines 123 which can provide limited or restricted views to users of the underlying logic flows and rules, a custom rules engine 123 can be configured to allow the full logic of the rules to be visible and modifiable at the customer's premises.

According to an exemplary embodiment, the knowledge manager 120 can include at least one diagnostic assistant 127. The diagnostic assistant 127 is configured to collect data from the plurality of data sources 115 via the plurality of connector gateways 110 and to apply the collected data to the rules engine 123 to generate the diagnostic conclusions. The diagnostic assistants 127 are software processes or agents associated with the knowledge manager 120 that can be spawned or otherwise instantiated by a user or automatically by the knowledge manager 120 or system 100 to perform certain tasks. For example, if a user desires to determine the status of a particular service running on a node in the computer network, the user's request can spawn a diagnostic assistant 127 to collect the appropriate data, apply that data to the rules engine 123 and provide the diagnostic conclusion and other associated status information back to the user. Alternatively, a diagnostic assistant 127 can be spawned and maintained by the system 100 to perform the function of, for example, an event handler to process events from an event server connected through a connector gateway 110. Thus, the diagnostic assistants 127 are configured to assist the user or system 100 to diagnose the impairments in the computer networking services. According to exemplary embodiments, the knowledge manager 120 can support any number of diagnostic assistants 127.

The system 100 includes an interactor 130 in communication with the knowledge manager 120. The interactor 130 is configured to generate format information for displaying at least the diagnostic conclusions to the user. According to exemplary embodiments, the interactor 130 provides an interface (e.g., an XML interface or the like) between the knowledge manager 120 and the user. The interface provided by the interactor 130 can also be used to integrate the system 100 into other network management/error management systems or the like. The interactor 130 is configured to convert or otherwise transform data from the knowledge manager 120 into a data format displayable to a user on a graphical user interface or for processing by any suitable Web server or other management system. Thus, as used herein, "format information" includes any data that is capable of being rendered or otherwise represented to a user, or processed by another management system or the like, in a graphical and/or textual manner. In addition, the interactor 120 is configured to receive input from the user (e.g., through a graphical user interface or other display means) and convert the user input into a data format that can be used by the knowledge manager 120. According to an exemplary embodiment, the interactor 130 can be in communication with at least one of the plurality of connector gateways 110 to provide, for example, generic query capabilities and the like if a bypass of the rules engine 123 is necessary.

According to exemplary embodiments, the interactor 130 can, for example, support XML commands and responses, provide access to administration functions, allow the user to query input requirements for the knowledge manager 120, provide the ability to monitor session execution progress, represent session results (e.g., incremental or batch) to clients, provide the ability to preempt session execution, implement functional restrictions based upon the client user type or a licensed feature set, and the like. In addition, the interactor 130 can provide the ability to query available diagnostic assistants 127 and required parameters, execute one or more diagnostic assistants 127, monitor running or otherwise active diagnostic assistants 127, acquire the diagnostic conclusions from the diagnostic assistants 127, and terminate an active diagnostic assistant 127. Thus, the interactor 130 provides the capability for clients to interact with, control and receive information from the knowledge manager 120, rules engine 123, diagnostic assistants 127 and the system 100. According to an alternative exemplary embodiment of the present invention, the interactor 130 can form a component of the knowledge manager 120.

The system 100 can include a display in communication with the interactor 130 configured to represent the format information from the interactor 130. The display can comprise a monitor or any suitable type of display means for representing the format information to a user. More particularly, the system 100 includes a graphical user interface (GUI) 140. The GUI 140 is configured to display the format information from the interactor 130 to the user. For example, the GUI 140 is configured to display iconic and/or hierarchical representations of diagnostic conclusions to the user. In addition, the GUI 140 can be configured to display iconic and/or hierarchical representations of diagnostic information and computer networking services information to the user (e.g., information details and the like to support the diagnostic conclusions). Furthermore, the GUI 140 can be configured to display iconic and/or hierarchical representations of active diagnostic assistants 127 to the user. According to an exemplary embodiment, the GUI 140 can be configured to display the computer networking services to the user from a service-centric perspective based on the computer networking services of the user. The GUI 140 can include any suitable type of Web server(s), such as, for example, a Tomcat server, HTTP(S) server and the like, and can be implemented using any standard web-server languages (e.g., Java, JSP, Javascript, and the like).

The system 100 can include at least one archival database 150 in communication with the knowledge manager 120. The system 100 can include any number of databases 150. The databases 150 can be configured to store at least the diagnostic conclusions and information associated with the impairments of the computer networking services. According to exemplary embodiments, the databases 150 can be used to store and track, for example, users, rules, session information, and other data not dynamically discovered from the computer networking services. The databases 150 can be comprised of, for example, an open-source MySQL database. Using a MySQL database, the knowledge manager 120 can access the database 150 via a JDBC interface. JDBC is a standard Java database connectivity solution. However, the databases 150 can be comprised of commercial databases, such as, for example, relational databases developed by Sybase Inc., Oracle Inc. or other standards-compliant databases. According to an exemplary embodiment, the databases 150 are substantially "invisible" to the end-user. Such "invisibility" can be accomplished by defining explicit limits and constraints within the database administration functions, such as, for example, bounding the size of the database 150, automatically cleaning up database logs, and the like.

The system 100 can include a diagnostic report generator 160 in communication with the at least one archival database 150 and the interactor 130. The diagnostic report generator 160 can be configured to extract stored information from the databases 150 and to generate formatted reports from the extracted information for display to the user via GUI 140 or other display or print means. The diagnostic report generator 160 provides the capability for clients to generate various reports in numerous formats on, for example, the results of diagnostics, usage of the knowledge manager 120 and diagnostic assistants 127, audits of performed test, and any other reportable information on the computer networking services. Reports generated by the diagnostic report generator 150 can include, for example, mean-time-to-trouble-identification (MTTI), trouble tickets per technician, diagnostic summary statistics, inconclusive diagnostics (e.g., due to unavailable diagnostic assistants 127 or diagnostic appliances), the number of repeat diagnostics, performance reports and the like. Although the diagnostic report generator 160 can be internal to the system 100, according to an alternative exemplary embodiment, the diagnostic report generator 160 can comprise an external, commercial reporting engine with, for example, a JDBC connection or the like to the databases 160.

Exemplary embodiments of the present invention provide the ability to perform analysis at multiple layers of service of the 7-layer ISO networking model simultaneously and represent a coordinated set of diagnostic conclusions that allow the user to isolate the problem to the appropriate layer. By analyzing multiple service layers, diagnostic conclusions can be provided at, for example, the element, circuit or service level. For example, a VoIP service (layers 6-7) can be deployed over a Virtual Local Area Network (VLAN) (layers 4-5) implemented on top of basic IP service (layer 3) over an ATM (layer 2) network over T3 transport services (layer 1). Each service layer can have impairment symptoms caused by problems at that layer or by problems at a lower layer. According to exemplary embodiments, by representing the multi-layer diagnostic conclusions and, for example, ranking them in the order of highest severity prevents the user from chasing after "shadow" problems that can waste time and decrease efficiency and productivity.

For purposes of illustration and not limitation, a diagnostic assistant 127 can be instantiated to conduct periodic tests of the computer networking services. The diagnostic assistant 127 can first communicate with the diagnostic and test systems via the appropriate connector gateways 110 to begin testing of the computer networking services, if such tests have not already been conducted. The diagnostic assistant 127 collects the computer network data returned as a result of the conducted tests and applies this computer network data to the rules engine 123 to generate diagnostic conclusions associated with, for example, the technical aspects of the computer networking services.

Figure 2A:
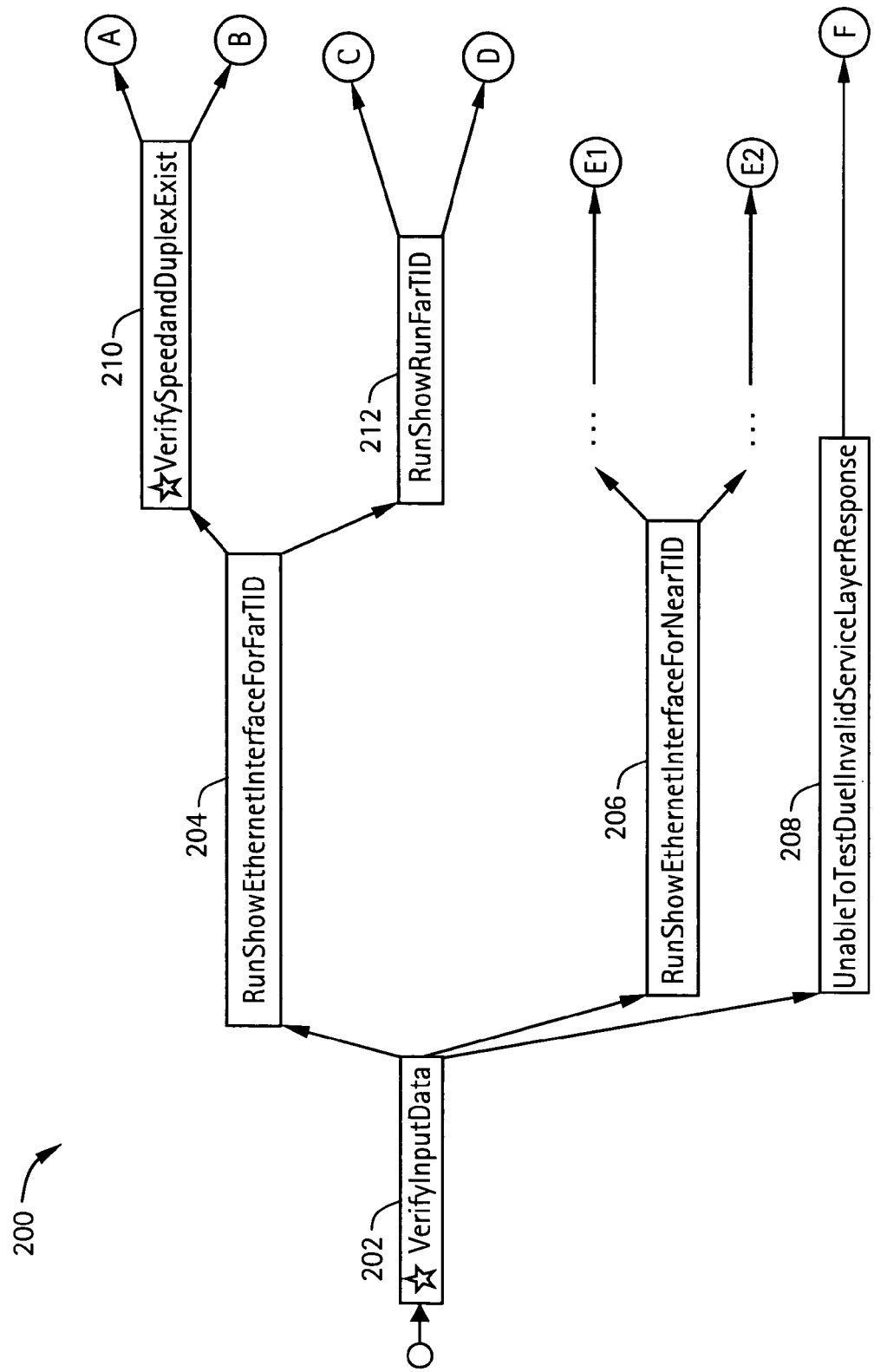
Figure 2B:
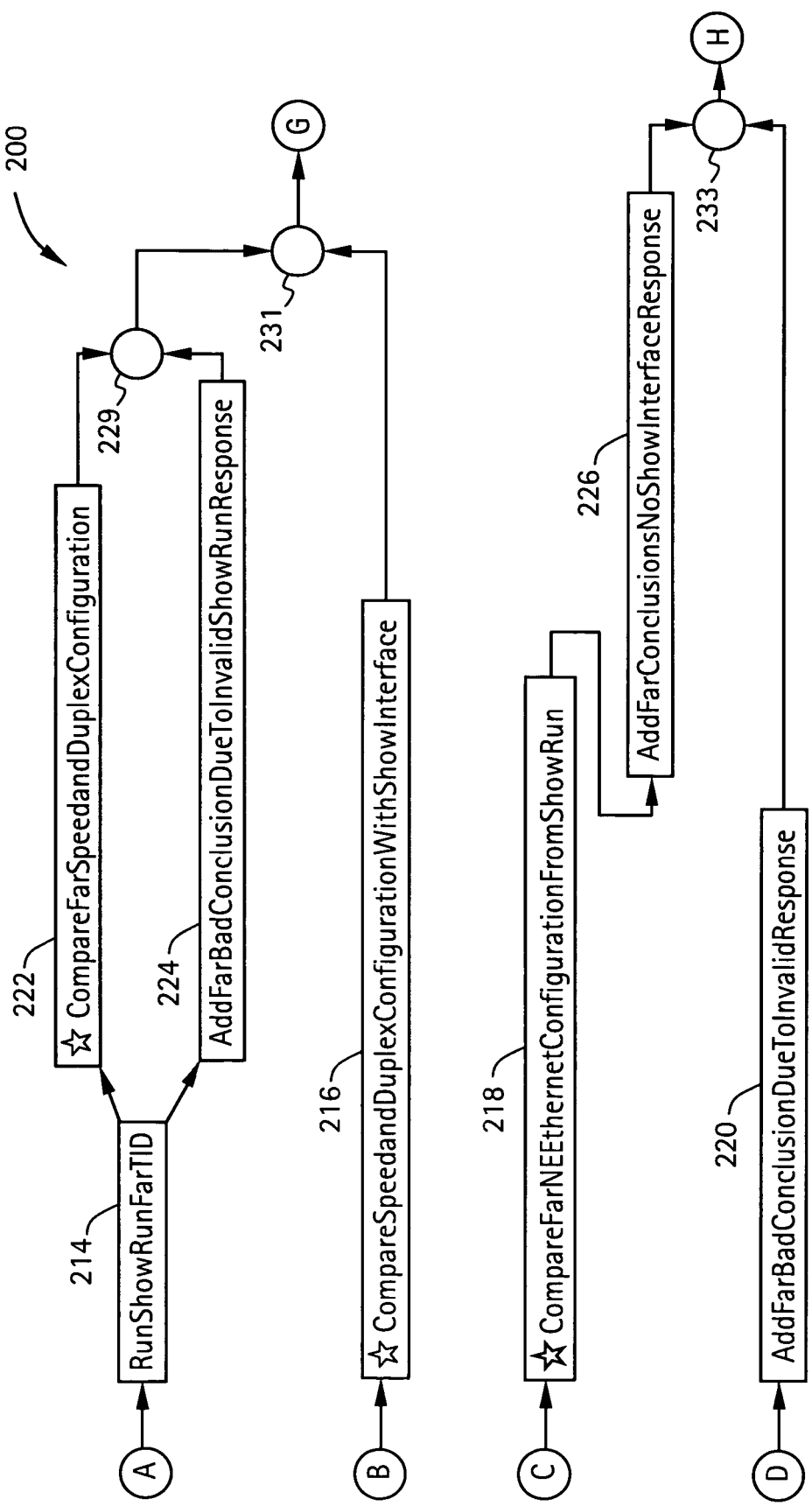

As discussed previously, the rules engine 127 comprises logic flows and rules that analyze the data collected from the data sources 115 and uses the results of that analysis to traverse a logic tree of possible diagnostic conclusions. FIGS. 2A, 2B and 2C are an illustration of logic flows in a logic tree 200 for generating diagnostic conclusions, in accordance with an exemplary embodiment of the present invention. For purposes of the present illustration, the logic tree 200 is used, for example, for verifying an Ethernet network element configuration. In FIGS. 2A, 2B and 2C, each logic block 202, 204, 206, . . . is comprised of one or more rules for determining the output of the respective logic block. Additionally in FIGS. 2A, 2B and 2C, if a logic block (e.g., logic block 202) contains a star, then that logic block calls one or more additional logic flows (e.g., logic flow "subroutines") to generate a response, with each logic flow subroutine comprised of one or more rules. Consequently, the logic flows can be of any desired complexity to address each possible scenario encountered by system 100 in diagnosing the impairments in computer networking services. According to exemplary embodiments, each of the logic blocks and their logic flow subroutines can be executed either locally or remotely to distribute processing of the logic trees to improve performance of the system 100.

Referring to FIG. 2A, logic block 202 ("VerifyInputData") is first executed to verify the input data collected by the diagnostic assistant 127. Based on the result of logic block 202, either logic block 204 ("RunShowEthernetInterfaceForFarTID"), 206 ("RunShowEthernetInterfaceForNearTID") or 208 ("UnableToTestDuelInvalidServiceLayerResponse") is executed. For purposes of clarity, the logic flow associated with logic block 206 has been omitted from FIGS. 2A, 2B and 2C, as the logic flow with respect to logic block 204 will be discussed. Assuming that logic block 204 is executed, either logic block 210 ("VerifySpeedandDuplexExist") or 212 ("RunShowFarTID") is executed. If logic block 210 is executed, then depending upon the result of logic block 210, either logic block 214 ("RunShowFarTID") or logic block 216 ("CompareSpeedandDuplexConfigurationWithShowInterface") (both illustrated in FIG. 2B) is executed. If logic block 214 of FIG. 2B is executed, then either logic block 222 ("CompareFarSpeedandDuplexConfiguration") or logic block 224 ("AddFarBadConclusionDueToInvalidShowRunResponse") is executed. The outputs of logic blocks 222 and 224 are fed to logic node 229, with the output of logic node 229 fed to logic node 231. If logic block 216 is executed instead, the output of logic block 216 is fed to logic node 231. In FIG. 2C, the output of logic node 231 is fed to logic block 234 ("CompareFarPEEthernetConfiguration"), with the output of logic block 234 provided as input to logic block 236 ("VerifyFarEthernetNEInterfaceUPUP"). The output of logic block 236 is fed to logic node 239.

However, if logic block 212 of FIG. 2A is executed instead of logic block 210, then either logic block 218 ("CompareFarNEEthernetConfigurationFromShowRun") or logic block 220 ("AddFarBadConclusionDueToInvalidResponse") (both illustrated in FIG. 2B) is executed. The output of logic block 218 of FIG. 2B is input to logic block 226 ("AddFarConclusionsNoShowInterfaceResponse"), with the output of logic block 226 fed to logic node 233. If logic block 220 is executed, then the output of logic block 220 is fed to logic node 233, instead. The output of logic node 233 is input to logic node 239 of FIG. 2C. In FIG. 2C, either the output of logic node 239 (the result of traversing the logic flow associated with logic block 204), logic node 241 (the result of traversing the logic flow associated with logic block 206), or logic block 208 (indicating that a test was unable to be performed) is applied to logic node 243. The output of logic tree 200 is then provided at logic node 245, which forms a diagnostic conclusion based on, for example, the computer network data. For example, the diagnostic conclusion of the computer network data could reveal that a portion of the computer networking services is experiencing an outage. As can be seen from FIGS. 2A, 2B and 2C, numerous paths can be traversed through logic tree 200 to generate different diagnostic conclusions, depending on the data collected by the diagnostic assistant 127 and the rules used to populate the logic blocks of the logic tree 200 of rules engine 123.

However, exemplary embodiments of the present invention use data from additional sources to produce a "final" comprehensive and coordinated diagnostic conclusion for presentation to the user. Thus, the diagnostic conclusion associated with the computer network data of the present illustration is further augmented by application of business-related data to determine, for example, whether bills have been paid, whether computer networking services are configured properly and the like. Additionally, change management policy of the provider can be checked to determine whether any of the problems being diagnosed are scheduled (e.g., the outage of the particular portion of the computer networking services was scheduled). The extra-enterprise environmental data can also be checked to determine whether, for example, large storms are moving through the area that could be the cause of the problems being diagnosed (e.g., the storm is causing the outage of the particular portion of the computer networking services). The analysis of the business-related and extra-enterprise environmental data can also be performed using logic trees, similar to those illustrated in FIGS. 2A, 2B and 2C. According to exemplary embodiments, the computer-related data, business-related data and extra-enterprise environmental data can each be analyzed using separate logic trees, combinations of logic trees, or one logic tree that analyzes all data simultaneously, depending upon how the rules engine 123 is established, the desired performance of the system 100, and other like factors. Thus, the analysis of all relevant data sources 115 results in the "final" comprehensive and coordinated diagnostic conclusion that is presented to the user.

According to exemplary embodiments, the diagnostic conclusions can comprise recommended actions for correcting the impairments in the computer networking services. For purposes of the present illustration, if a repair or update is recommended by the diagnostic conclusion, exemplary embodiments can, for example, query the business-related data to determine whether the proper level of change management clearance exists before performing the repair or update. Consequently, the system 100 can be incorporated into the overall processes of a business or enterprise without the need to change the current processes of that business or enterprise.

The diagnostic conclusions can also comprise a severity weighting factor for ranking the diagnostic conclusions that indicates which diagnostic conclusions should be addressed first. According to exemplary embodiments, the diagnostic conclusions include "adaptive details" that provide information in support of the diagnostic conclusion. These adaptive details contain specific information about the problem locations as well as (e.g., graphical) representations of the underlying data sources. For example, the diagnostic conclusions can comprise impairment information on the impairments in the computer networking services. For example, the impairment information can include the locations of the impairments in the computer networking services or other appropriate information associated with the impairments. For purposes of illustration and not limitation, some examples of possible diagnostic conclusions can include (although many other examples are possible):

Out of Order Packets on VoIP Service
    Details: Excessive jitter detected caused by out-of-order packages.
    Action: Disable queuing at Ethernet Port '35' on router RCKVLLE
    Severity: High
VRF Table Incorrect for VLAN '1234'
    Details: VRF entries have incompatible routes at Routers "RCKVLLE" and "BALTMR"
    Action: Escalate to Tier-Three support at Rockville Network Operations Center
    Severity: Medium According to exemplary embodiments, the output of diagnostic assistants 127 provides the user with a list of highly probable diagnostic conclusions. These diagnostic conclusions provide explicit feedback to the user intended to direct them to a course of action that will resolve the problem. To be effective, the diagnostic conclusions must be relevant to the end user and direct the user toward a resolution. Consequently, the user is given information, not just data. The "conclusion driven" analysis according to exemplary embodiments is an effective part of the knowledge manager 120 output, because it enables, for example, Tier-1 network support personnel and other like personnel to quickly take actions to resolve problem reports, thereby significantly increasing the overall customer service quality.

The recommended actions and severity weighting are highly customizable to the needs and terms of a specific customer. For example, the user can specify or alter severity weighting factors for particular diagnostic conclusions to change the priority of various impairments. According to exemplary embodiments, at least one event can be associated with a particular diagnostic conclusion. The at least one event is configured to execute in response to the particular diagnostic conclusion. For example, the at least one event can comprise additional diagnostics of the computer networking services by the system 100. Additionally or alternatively, the at least one event can comprise an automatic repair of the computer networking services to automatically correct the impairments. However, any suitable event can be associated with a diagnostic conclusion.

For purposes of illustration and not limitation, if it is determined that a router port is down, the diagnostic assistant 127 can determine which business unit is associated with this port (e.g., by querying the appropriate business-related data sources). The diagnostic assistant 127 can then locate a list of personnel responsible for the router using the business-related data, scan the rotation to determine who is on call based on the current date, and notify the party of the diagnostic conclusion by e-mail, paging or other suitable means. If no response is received, the diagnostic assistant 127 can automatically notify the administrator or the administrator's manager or the next individual(s) listed in the business unit's chain of command. Once the impairment is resolved, the diagnostic assistant 127 can halt the escalation. Other such events can be associated with diagnostic conclusions, and those events can be customized by the user or system 100.

According to exemplary embodiments, the rules engine 123 is also highly customizable to the needs and terms of a specific customer. For example, the user can add new logic trees, logic flows and rules to adapt the rules engine 123 to, for example, the particular computer networking services of the user, the particular data that can be received from propriety data sources 115 and the like. In addition, the rules of the rules engine 123 can be "scoped" to limit the bounds of particular rules. For example, "temporal scoping" can be used to limit the amount of time that the rules engine 123 can spend analyzing data. For temporal scoping, a rule can be added to a particular rule that causes the rules engine 123 to stop analyzing data after a predetermined period of time (e.g., a given number of seconds), or after a predetermined amount of data has been analyzed (e.g., analyze the first X pieces of data collected). In addition, "user scoping" can be performed to limit the amount and types of data analyzed by the rules engine 123 (e.g., for User A, analyze data from Source 1 and Source 2, while for User B, analyze data from all relevant sources).

According to an exemplary embodiment, the user can alter at least one of time, accuracy and efficiency of the rules engine 123 to modify the length of time taken to generate the diagnostic conclusions by the knowledge manager 120. For example, if the rules engine 123 is taking an excessive amount of time to generate diagnostic conclusions for a particular impairment, the user can "force" the rules engine 123 to generate diagnostic conclusion more quickly by, for example, adding a rule that decreases the amount of time the rules engine 123 is allowed to spend analyzing data (i.e., temporal scoping). However, by altering the time that the rules engine 123 is allowed to spend analyzing data, the accuracy and efficiency of the rules engine 123 will also change accordingly (e.g., better time performance at the expense of accuracy). Thus, exemplary embodiments of the present invention provide a means for performing diagnostic trend and performance analysis that can be used to optimize the diagnostic conclusions with respect to, for example, the performance of system 100, a particular user's needs and the like.

According to exemplary embodiments, the rules engine 123 can be configured to adapt to the computer networking services using the diagnostic conclusions. In other words, "adaptive" or "system" learning can be performed by modifying the behavior of the rules engine 123 to make diagnosing future impairments and generating resulting diagnostic conclusions more efficient and faster. For example, a computer networking service event could occur at regular intervals (e.g., a given service goes down each Saturday night at midnight for maintenance). A diagnostic assistant 127 can be used to store or have stored a record of the repeated event, access business-related data and extra-enterprise environmental data to determine if the event was scheduled or weather-related, and the like to determine whether the event can be classified as recurring. If it is determined that the event is a recurring event, the diagnostic assistant 127 can modify the rules engine 127 by adding a rule(s) dynamically to generate a given diagnostic conclusion upon detection of the recurring event, without the need to collect additional data or perform extensive analysis. Other adaptive or system learning can be performed using the diagnostic assistants 127 in combination with the rules engine 123 to improve the efficiency and speed of the system 100. Thus, by modifying existing rules and adding new rules, either manually by the user or automatically by a diagnostic assistant 127, any suitable type of scoping or adaptation can be performed to tailor the rules engine 123 to the needs and computer networking services of a particular user.

Figure 3:
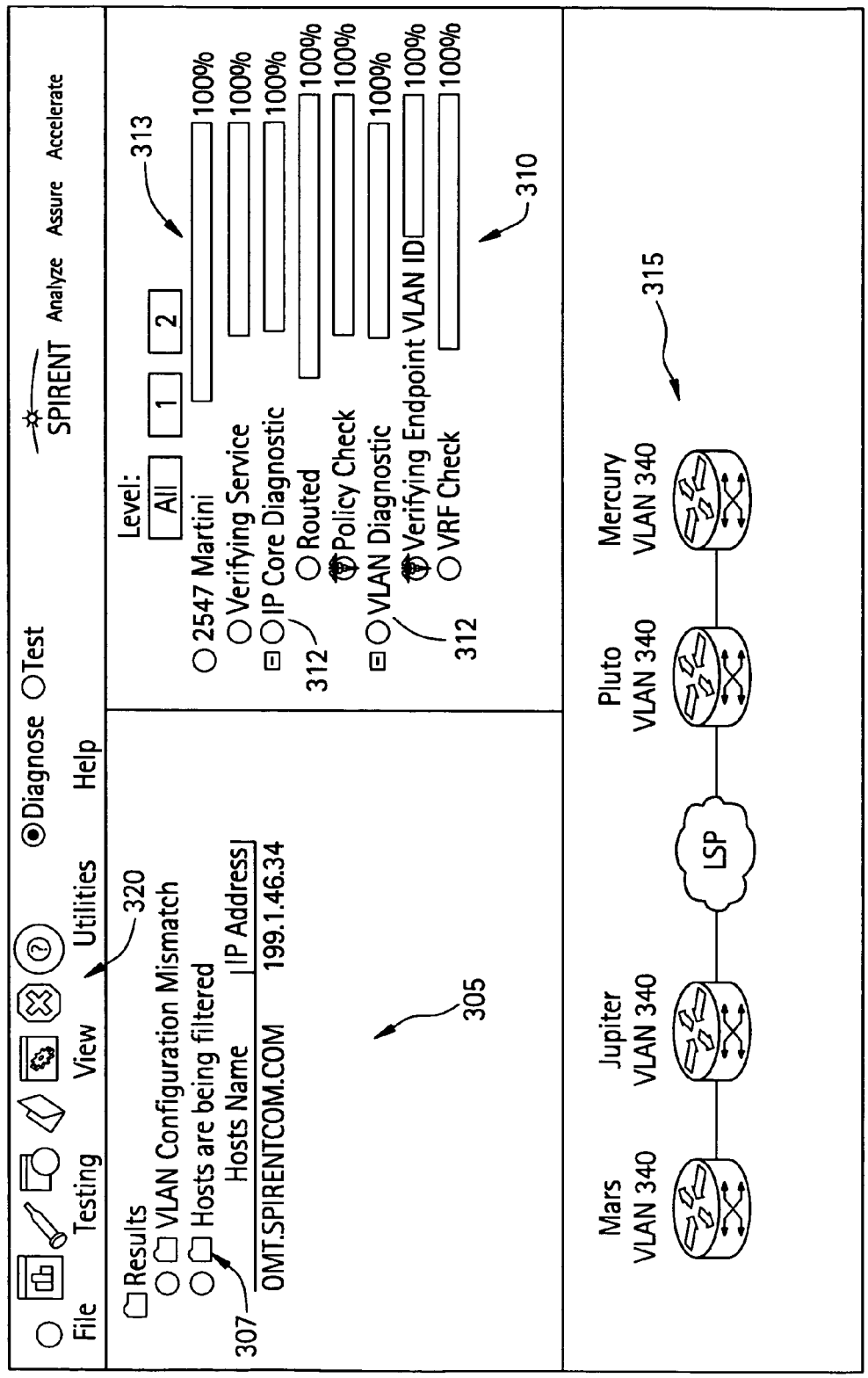
FIG. 3 is an illustration of a graphical user interface for displaying diagnostic conclusions to a user, in accordance with an exemplary embodiment of the present invention.

As discussed previously, according to exemplary embodiments, the diagnostic conclusions and associated impairment information can be displayed to the user through GUI 140 in a manner that does not inundate the user with excessive amounts of data. FIG. 3 is an illustration of a graphical user interface (GUI 300) for displaying diagnostic conclusions to a user, in accordance with an exemplary embodiment of the present invention. For purposes of illustration and not limitation, the GUI 300 can include three windows or panels 305, 310 and 315, although any suitable number of windows or panels can be used to display information to the user. Panel 305 can be used to display diagnostic conclusions in a hierarchical representation. For example, each folder 307 can be titled with the description of the diagnostic conclusion returned by a diagnostic assistant for the impairment of the computer networking services. The user can then expand a folder 307 (in a manner similar to WINDOWS™Explorer) to view the details of the diagnostic conclusion, including impairment and other diagnostic information associated with the diagnostic conclusion.

Panel 310 can be used to display an indication of active diagnostic assistants 312. Each status bar 313 can provide an indication of the percentage completion of a running diagnostic (e.g., where 100% represents a completed diagnostic by the associated diagnostic assistant 312). The indication of active diagnostic assistants 312 can also be represented in a hierarchical fashion, so that the user can click on and expand the diagnostic assistant 312 to view, for example, details of the diagnostics being performed by the diagnostic assistant 312. Additionally, Panel 310 can be used to, for example, query available diagnostic assistants 312 and required parameters, execute one or more diagnostic assistants 312, monitor active diagnostic assistants 312, terminate active diagnostic assistants 312 and the like. Panel 315 can be used to display a service-centric perspective of the computer networking services. As used herein, a "service-centric" perspective comprises a portrayal of a network from the standpoint of a customer and the computer networking services that are running on and deployed over the network. A service-centric perspective of a network can illustrate, for example, where and what computer networking services are located in the network. The GUI 300 can also include a menu bar 300 that provides access to functionality for controlling the system 100 via menu items or a toolbar buttons. Those of ordinary skill in the art will recognize that other configurations of the GUI 300 can be used to display the diagnostic conclusions, diagnostic assistants and service-centric perspective of the network to a user.

Figure 4A:
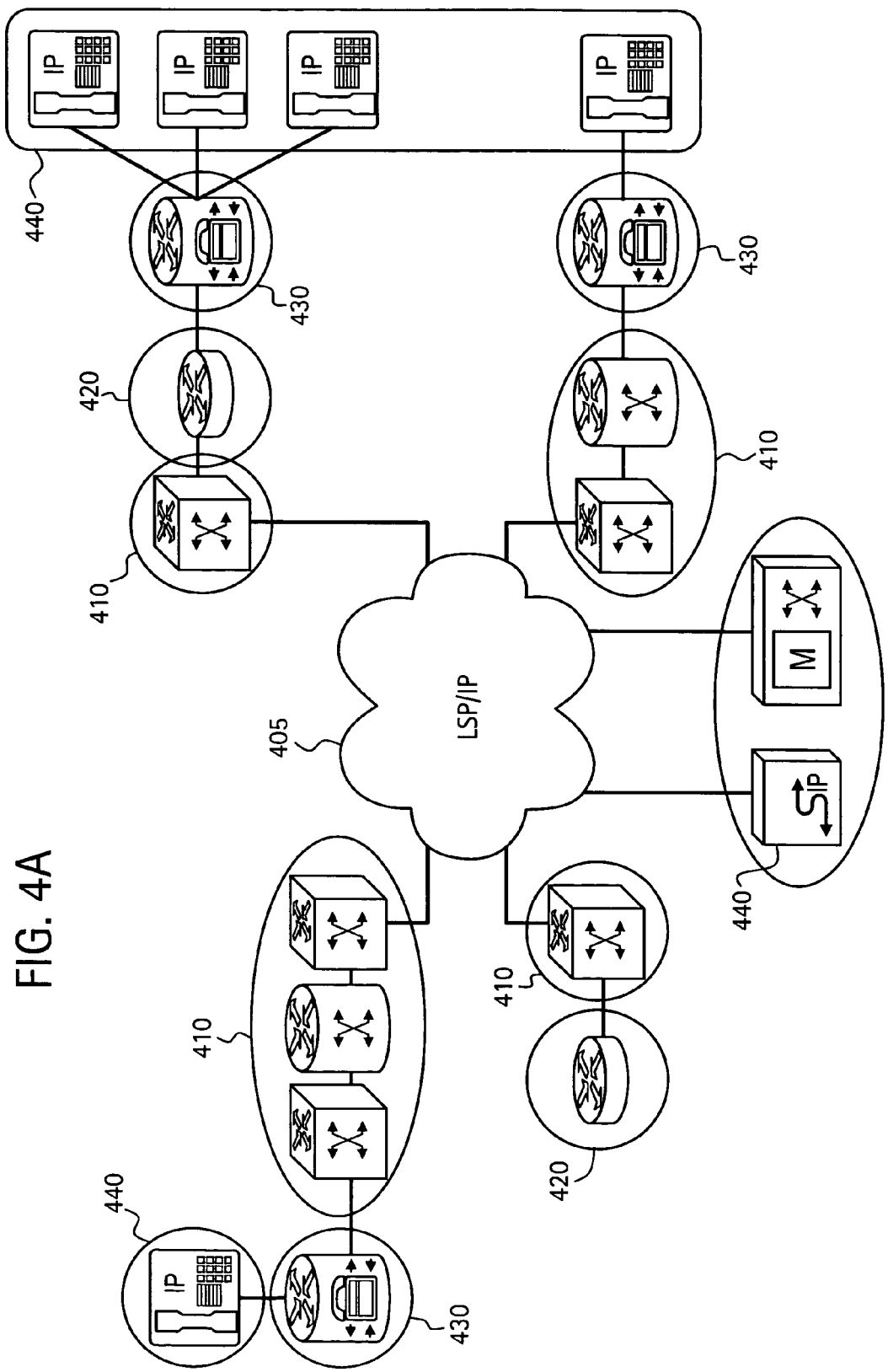
FIGS. 4A, 4B, 4C and 4D are illustrations of service-centric perspectives of computer networking services, in accordance with an exemplary embodiment of the present invention.

FIGS. 4A, 4B, 4C and 4D are illustrations of service-centric perspectives of computer networking services, in accordance with an exemplary embodiment of the present invention. FIG. 4A is a multi-layer view of the computer networking services deployed over a link-state packet (LSP)/IP network 405. From the high-level multi-view layer, the user can then drill-down to other layers to view details of the computer network services associated with those layers. For example, the multi-layer view of FIG. 4A displays the Layer 1-2 Service Layer 410, the IP Service Layer 420, the VoIP and IP Service Layer 430 and the VoIP Service Layer 440. In other words, the network is displayed to the user from the standpoint of the computer services associated with the various layers of the 7-layer ISO networking model.

Figure 4B:
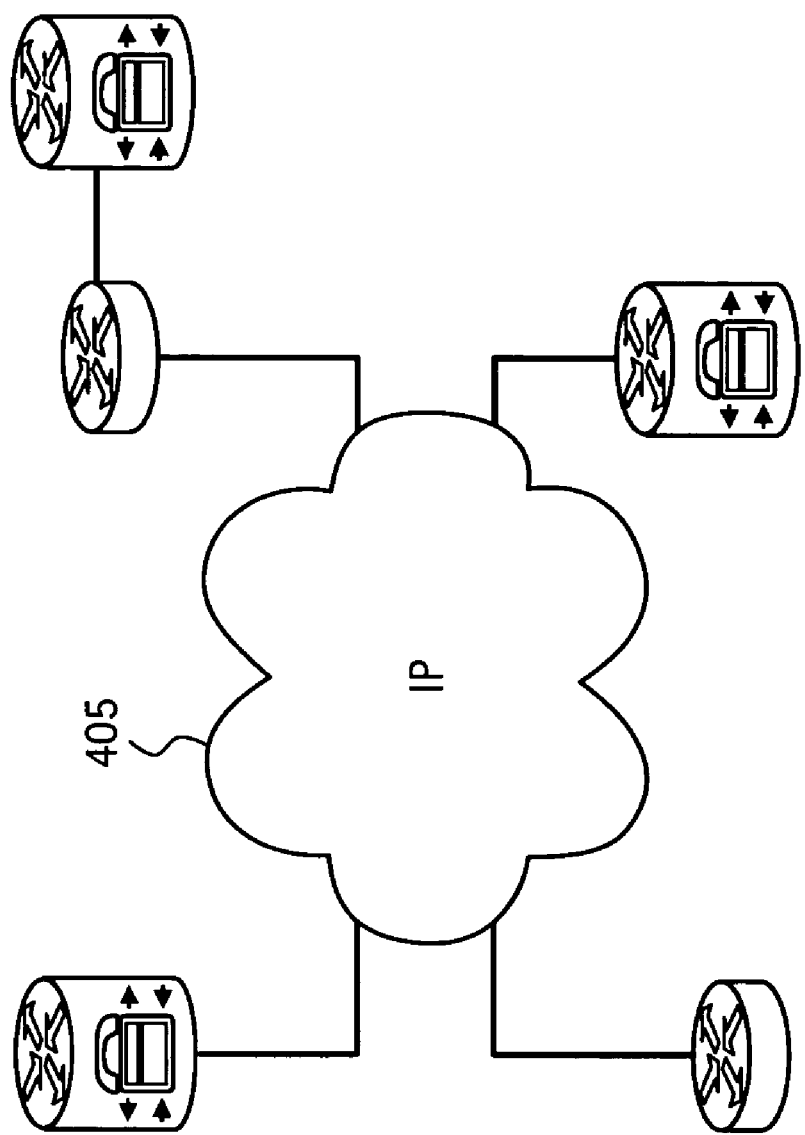
Figure 4C:
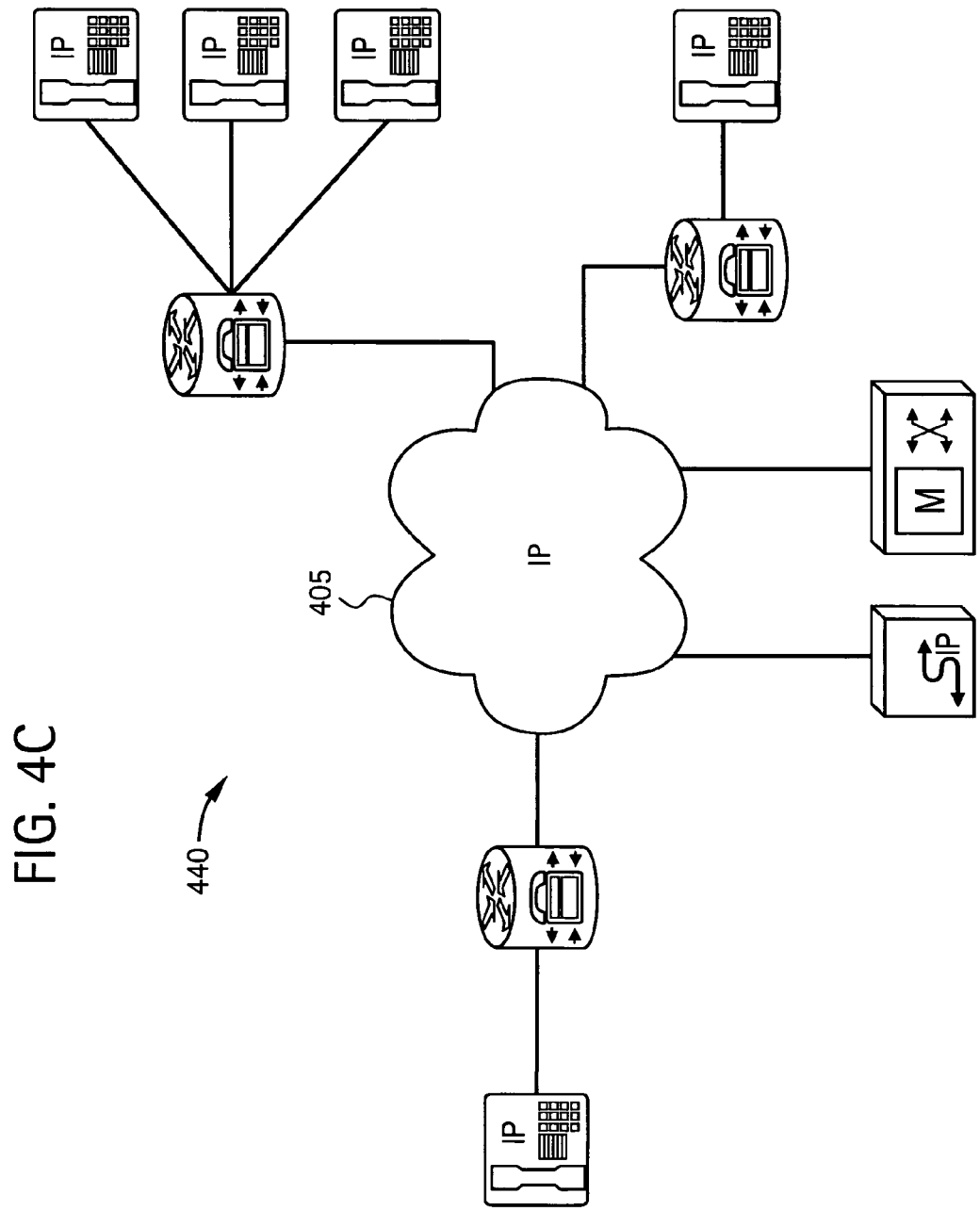
Figure 4D:
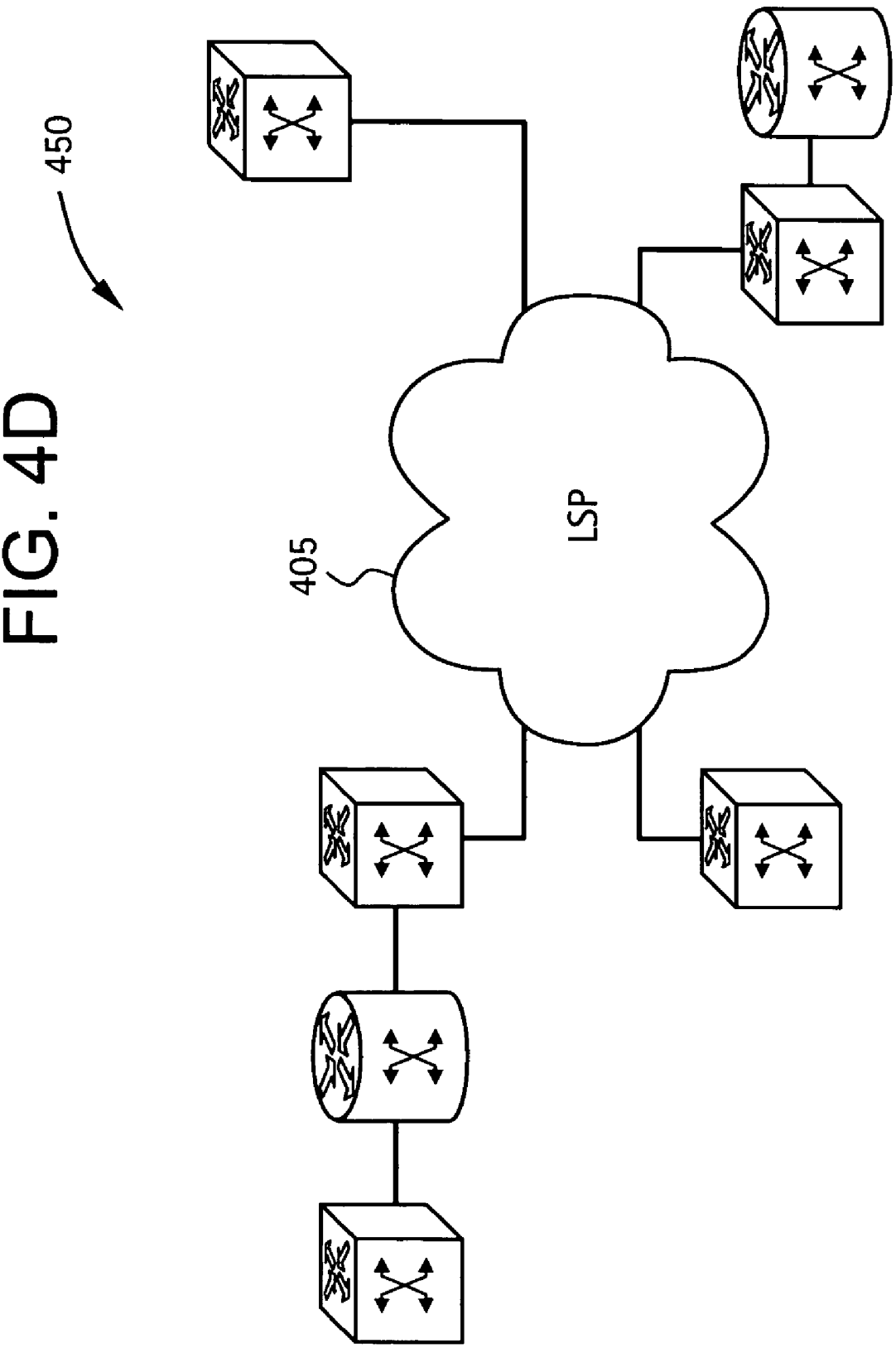

For example, by clicking on the high-level representation of the Layer 1-2 Service Layer 410 in FIG. 4A, the user can be presented with a more detailed view of the Layer 1-2 Service Layer 410. FIG. 4B is a detailed graphical representation of the computer networking services associated with the Layer 1-2 Service Layers 410. For example, by clicking on the high-level representation of the VoIP Service Layer 440 in FIG. 4A, the user can view a drill-down perspective of the VoIP Service Layer 440. FIG. 4C is a detailed graphical representation of the computer networking services associated with the VoIP Service Layer 440. Details of other computer networking services can also be viewed by the user by drilling-down from the multi-layer view of FIG. 4A. For example, FIG. 4D illustrates a detailed graphical representation of the computer networking services associated with the Transport Layer Security (TLS) Service Layer 450 associated with the LSP network 405. Thus, the multi-layer view of FIG. 4A can be used to display the computer networking services associated with the various layers of a computer network to allow the user to view and probe these services at varying levels of granularity and detail.

As discussed previously, typically, a complete network topology is presented to a user or customer when indicating errors and faults that are occurring in the network. Such a presentation requires the customer to sift through large amounts of information to diagnose the errors and faults in the network. According to alternative exemplary embodiments, however, a simplified view can be presented to customers of the computer networking services to assist in quickly and efficiently diagnosing impairments in the computer networking services. It has been determined that the vast majority of problems in computer networking services that occur in a network occur at an edge of that network. In contrast to diagnosing and displaying computer networking services using a complete network topology, exemplary embodiments of the present invention can use an "edge" model to diagnose and display such computer networking services. As used herein, an "edge" is an endpoint or outer periphery of a computer network, comprised of the devices, network elements, connections and computer networking services that exist along such an edge.

Exemplary embodiments of the present invention are directed to diagnosing the delivered computer networking services to a customer. The quality of those services can be defined by the customer's view. Consequently, the diagnostic capabilities should be as close to the customer edge as possible. The provisioning of customer computer networking services can involve the configuration at the provider's edge device closest to the customer. Traffic routing inside the provider's network can be dynamic, but is generally not considered part of the provisioned customer service. Connection between providers can also be considered edges in the sense that the customer computer networking service can require specific configuration at those locations, or this can define the nearest provider edge to the customer. Using an edge model, concern about network links between devices can be minimized, because network elements and devices can connect to the service provider's network uniquely. Consequently, the use of edge models according to exemplary embodiments can provide a major simplification to the diagnosis and display of computer networking services, in contrast to a generic network topology model.

Figure 7:
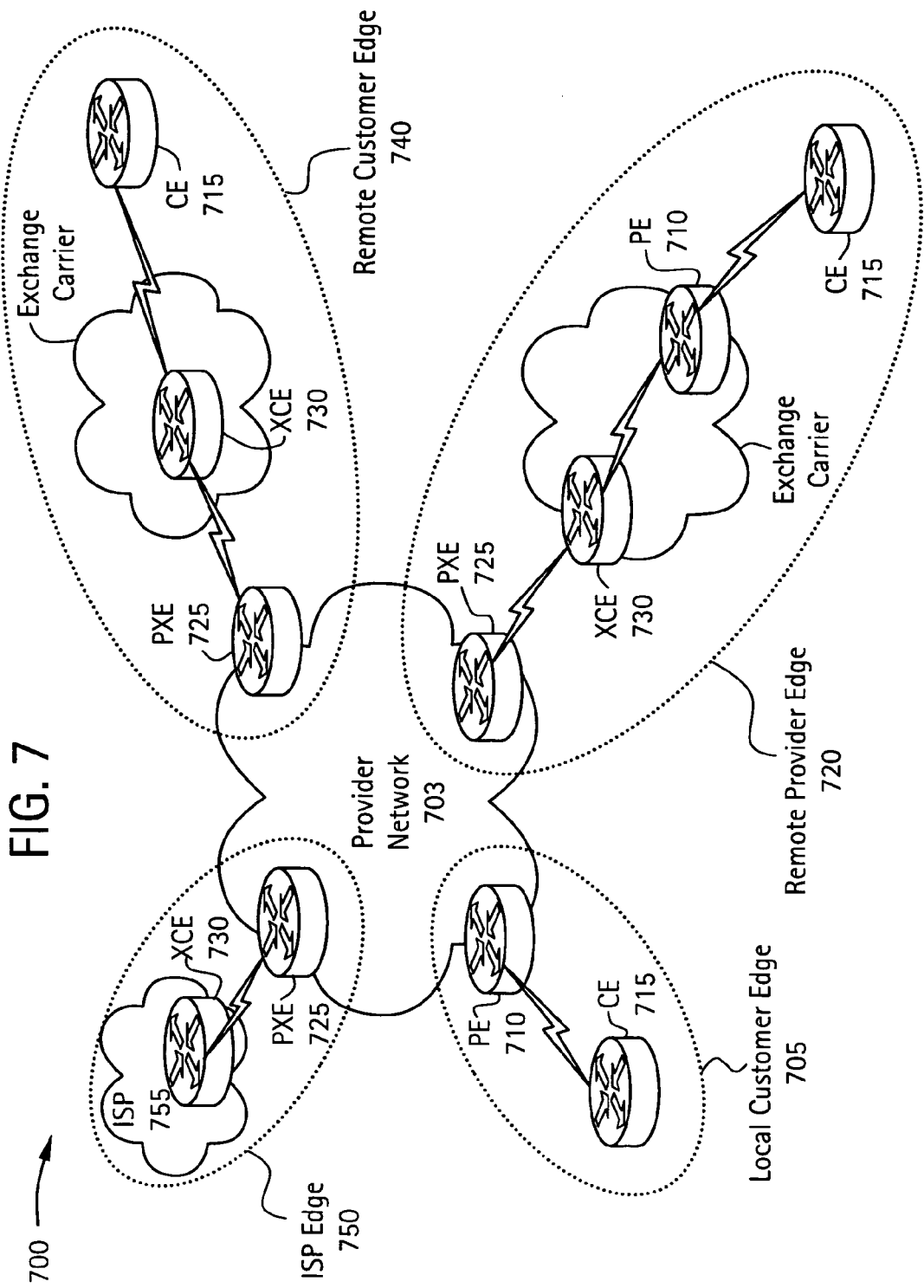
FIG. 7 is an illustration of a graphical user interface for displaying an IP edge model of computer networking services, in accordance with an alternative exemplary embodiment of the present invention

According to exemplary embodiments, a graphical user interface (e.g., GUI 140) can be configured to display at least the diagnostic conclusions associated with edges of an edge model of the computer networking services of a customer. For example, FIG. 7 is an illustration of a GUI for displaying an IP edge model 700 of computer networking services, in accordance with an alternative exemplary embodiment of the present invention. The IP edge model 700 defines the IP service layer by its connection to a provider network 703. According to exemplary embodiments, an IP edge can be comprised of one of several types of edges. For example, a local customer edge 705 can be defined by provider edge (PE) devices 710 and customer edge (CE) devices 715. A remote provider edge 720 can be defined as a remote provider services provided through a third-party exchange carrier, such as party exchange edge (PXE) devices 725, exchange carrier edge (XCE) devices 730, PE devices 710 and CE devices 715. A remote customer edge 740 can be defined as a remote customer services provided through a third-party exchange carrier, such as PXE devices 725, XCE devices 730 and CE devices 715. An Internet Service Provider (ISP) edge 750 can be defined by a termination point inside of an ISP 755, such as PXE devices 725 and XCE devices 730. However, additional or alternative edges can be defined in the IP edge model 700.

According to exemplary embodiments, in the IP edge model 700, a connection to a provider network 703 can be comprised of one of the aforementioned edges. In addition, a given computer networking service can include one edge, but can have multiple edges, as there is no limit on the number of edges that can be associated with a customer computer networking service. Using edges, the display of groups of devices can be collapsed down to an edge representation to simplify the display of computer networking services to the user. The customer or user can then zoom in/out or drill down/up within an edge to view the devices and computer networking services associated with that edge.

As used herein, a "provider edge" (PE) is the nearest device to the customer controlled by the provider. A PE device is considered inside the provider network 703. A "customer edge" (CE) is the first customer device beyond the provider edge that is visible from the provider edge. A CE device cannot be controlled by the provider. A "provider exchange edge" (PXE) is the nearest device to the exchange carrier's network controlled by the provider. A PXE device is considered inside the provider network 703. An "exchange carrier's edge" (XCE) is the first exchange carrier device beyond the provider exchange edge that is visible from the provider exchange. A XCE device may or may not be controlled by the provider. An ISP is a generic term for any suitable Internet Service Provider. An "exchange carrier" is a generic term for any third party network carrier through which the provider must provision service.

According to exemplary embodiments, each edge can be comprised of various characteristics to uniquely identify an edge in an edge model. For example, each edge can comprise an edge type (e.g., local customer, remote provider, remote customer or ISP), an edge location (e.g., near, far or the like), an edge identifier (e.g., an endpoint or the like), a list of all appropriate devices associated with the edge, references to underlying transport services (e.g., there may be multiple transport services associated with the edge). In addition, a combination of customer identification number and service identification number can be used to uniquely identify a computer networking service at an edge in the IP edge model 700. However, the user or customer can restrict diagnostics to a subset of edges (e.g., defined by endpoints) of the given computer networking service.

In addition, uncontrolled devices can have various characteristic information associated with each device to identify the (uncontrolled) device, such as, for example, a device identifier (e.g., a common name known by the provider), a device location (if known), and an IP address (e.g., the loopback address). Controlled devices can also have various characteristic information associated with each device to identify the (controlled) device, such as, for example, a device status, an associated diagnostic probe(s), and an access restriction (if any). The characteristic information for controlled devices can be in addition or alternatively to the characteristic information for the uncontrolled devices. Other identifying characteristic information can be used for either or both of the uncontrolled and controlled devices.

Using the IP edge model 700 displayed in a GUI, as illustrated, for example, in FIG. 7, a customer can diagnose problems in the network. For example, if there is a problem with a computer networking service in an edge, the edge "cloud" can be turned a different color (e.g., red) or other like indication can be used (e.g., flashing or sound) to indicate that there is a problem in that edge. The customer can then select that edge to drill down to determine the problem(s) in the computer networking services associated with that edge. For example, the edges associated with the given computer networking service can be listed or highlighted in the GUI. For the IP edge model 700, each edge can be one of the four types previously discussed. For each edge type, the edge can have the corresponding characteristic information associated with it. For each identified edge, the customer can then run a diagnostic (e.g., via a diagnostic assistant 127) on the edge (individually or concurrently with any number of other edges) to be provided with diagnostic conclusions for resolving impairments in the computer networking services associated with the edge(s). The customer or user can also list the devices associated with the given edge(s)

According to exemplary embodiments, each edge model can be associated with a network layer. For example, the IP edge model 700 is associated with the IP service layer of the customer's computer networking services. In contrast to conventional generic network topologies that are flat, edge modeling is hierarchical. In other words, each edge points to or otherwise references a layer below it, thereby allowing the customer to drill down/up to determine the problem in the appropriate network layer. Thus, a problem in a lower network layer can be propagated up to a higher layer, and the corresponding edge highlighted, thereby allowing the user to drill down and run diagnostics on the appropriate edge in the appropriate network layer. Thus, the network layers can be segmented from each other and then viewed as a hierarchy of edges to provide a simplified network view to the customer.

Figure 8:
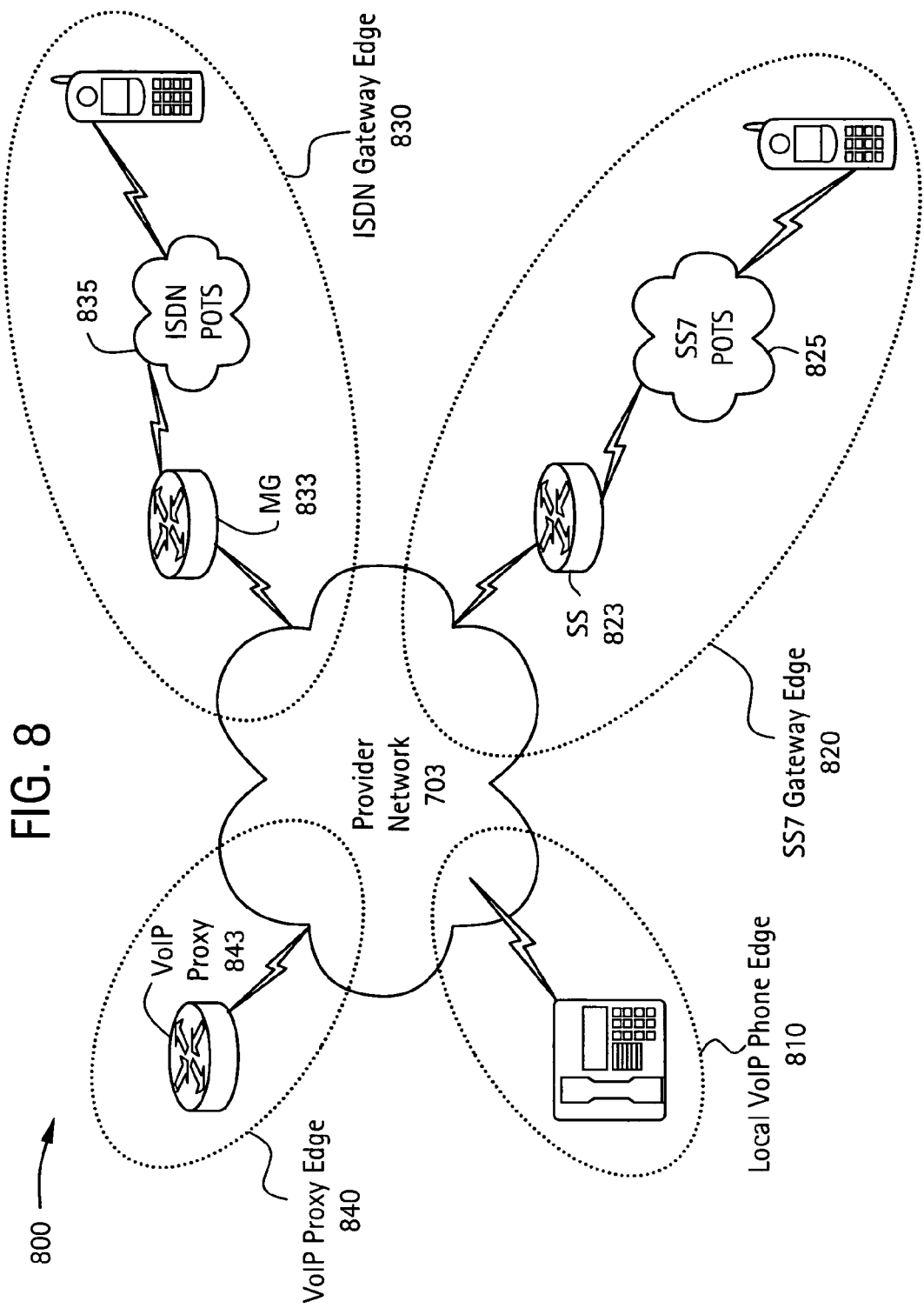
FIG. 8 is an illustration of a graphical user interface for displaying a voice over IP edge model of computer networking services, in accordance with an alternative exemplary embodiment of the present invention.

For example, FIG. 8 is an illustration of a GUI for displaying a voice over IP (VoIP) edge model 800 of computer networking services, in accordance with an alternative exemplary embodiment of the present invention. The VoIP edge model 800 resides "above" the IP edge model 700 in the graphical hierarchy. The VoIP edge model 800 can define the VoIP service by its provisioned properties in the provider network 703. According to exemplary embodiments, a VoIP edge can be one of several types. For example, a local VoIP phone edge 810 can be defined by the local VoIP service connected to the provider network 703. The SS7 gateway edge 820 can be defined by a softswitch (SS) network element 823 and a SS7 "cloud" 825 (optionally with a POTS telephone). The ISDN gateway edge 830 can be defined by a media gateway (MG) 833 to an ISDN POTS "cloud" 835 (optionally with a POTS phone). The VoIP proxy edge 840 can be defined by a VoIP proxy network element 843. According to exemplary embodiments, the VoIP connections to the provider network 703 can be one of these four edge types. However, additional or alternative edges can be defined in the VoIP edge model 800. As with the IP edge model, a combination of customer ID number and service ID number can be used to uniquely identify one service in the VoIP edge model 800. The customer or user can restrict diagnostics to a subset of edges (e.g., defined by endpoints) in the VoIP edge model 800. The edges of the VoIP edge model 800 can have the same, additional or alternative characteristic information as the edges of the EP edge model 700.

Figure 9:
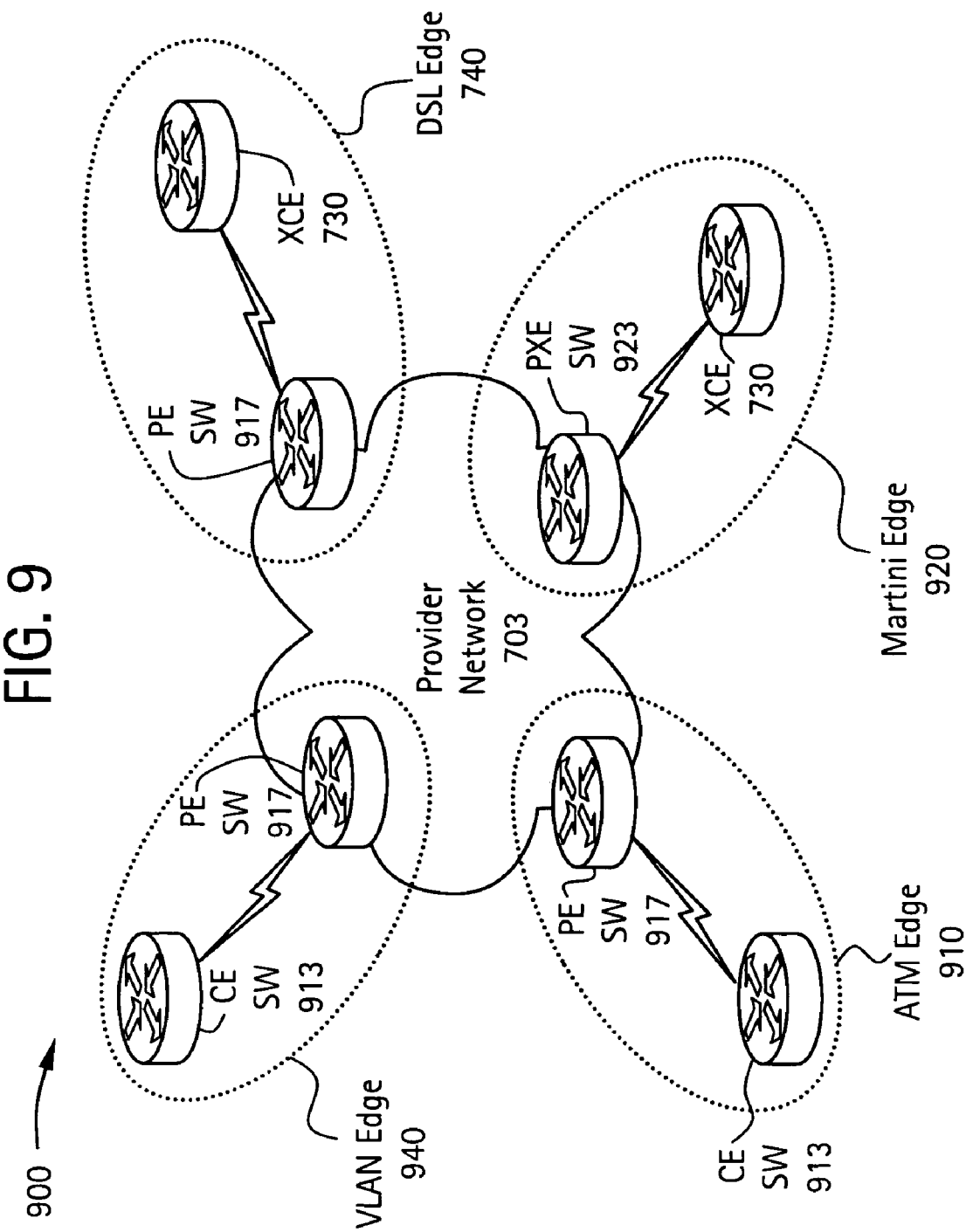
FIG. 9 is an illustration of a graphical user interface for displaying a transport edge model of computer networking services, in accordance with an alternative exemplary embodiment of the present invention.

For example, FIG. 9 is an illustration of a GUI for displaying a transport edge model 900 of computer networking services, in accordance with an alternative exemplary embodiment of the present invention. The transport edge model 900 resides "below" the IP edge model 700 in the graphical hierarchy (e.g., the transport layer can refer to the physical layer of the network layers). According to exemplary embodiments, a transport edge can be one of several types. For example, an ATM edge 910 can be defined by the CE switch (CE SW) device 913 and PE switch (PE SW) device 917. A Martini edge 920 (e.g., implementing the Martini VLAN protocol) can be defined by a XCE device 730 and PXE switch (PXE SW) device 923. A DSL edge 930 can be defined by a XCE device 730 and a PE SW device 917. A VLAN edge 940 can be defined by a CE SW device 913 and a PE SW device 917. However, additional or alternative edges can be defined in the transport edge model 900. As with the other edge models, the customer can restrict diagnostics to a subset of edges in the transport edge model 900.

According to exemplary embodiments, rule sets can be associated with each edge model. For example, the IP edge model 700 can have an IP edge rule set, the VoIP edge model 800 can have a VoIP edge rule set, and the transport edge model 900 can have a transport edge rule set. These rule sets can be used by the rules engine 123 of the knowledge manager 120 to analyze data from the plurality of data sources 115 to provide diagnostic conclusions for resolving impairments in the computer networking services associated with edges in the edge models.

The connector gateways 110, knowledge manager 120, rules engine 123, diagnostic assistant 127, interactor 130, GUI 140 and diagnostic report generator 160 of system 100 can each be implemented using any suitable means for performing the functions associated with the given component. Each component and the system 100 can be comprised of any suitable combination of hardware, software (e.g., Java, Javascript, XML, suitable databases, or the like) and firmware. The connector gateways 110, data sources 115, knowledge manager 120, rules engine 123, diagnostic assistant 127, interactor 130, GUI 140 and diagnostic report generator 160 can communicate with each other using any suitable means for communicating information and other electrical signals between such components, such as XML interfaces, middleware or other communication packages such as SOAP, and the like. The system 100 can also include, for example, any type of processor(s), including any type of microprocessor, microcontroller, digital signal processor (DSP), application-specific integrated circuit (ASIC), programmable read-only memory (PROM), erasable programmable read-only memory (EPROM), electrically-erasable programmable read-only memory (EEPROM), or the like. The system 100 can additionally or alternatively include or be connected to memory, such as, for example, any type of computer memory or any other type of computer storage medium that is located either internally or externally to the system 100, such as, for example, read-only memory (ROM), random access memory (RAM), cache memory, compact disc read-only memory (CDROM), electro-optical memory, magneto-optical memory, or the like.

FIG. 5 is a flowchart illustrating steps for diagnosing impairments in computer networking services, in accordance with an exemplary embodiment of the present invention. In step 505, an occurrence of at least one impairment in the computer networking services can be detected. In step 510, a plurality of data sources can be interfaced to so as to provide access to computer network data, business-related data, and extra-enterprise environmental data in the plurality of data sources. The computer network data can comprise, for example, data from computer network test sources and the like. The business-related data can comprise, for example, data from customer records databases, data from computer networking services databases and the like. The extra-enterprise environmental data can comprise, for example, news data associated with current events, weather data and the like. In step 515, data from the plurality of data sources can be collected. In step 520, the collected data can be applied to a rules engine.

In step 525, data from the plurality of data sources can be analyzed to generate diagnostic conclusions for resolving the at least one impairment in the computer networking services. The diagnostic conclusions can comprise, for example, recommended actions for correcting the impairments in the computer networking services. The diagnostic conclusions can further comprise, for example, a severity weighting factor for ranking the diagnostic conclusions. The diagnostic conclusions can also comprise impairment information on the impairments in the computer networking services, where the impairment information can comprise, for example, locations of the impairments in the computer networking services. According to exemplary embodiments, at least one event can be associated with a diagnostic conclusion. In step 530, the at least one event can be executed in response to the diagnostic conclusion associated with the at least one event. The at least one event can comprise, for example, additional diagnostics of the computer networking services, an automatic repair of the computer networking services to correct the impairments, or the like.

In step 535, format information can be generated for displaying at least the diagnostic conclusions to a user. Optionally, in step 540, at least one of time, accuracy and efficiency of the rules engine can be altered to modify a time length for generating the diagnostic conclusions. In step 545, the format information can be displayed to the user. Optionally, in step 550, at least the diagnostic conclusions and information associated with the impairments of the computer networking services can be stored. Optionally, in step 555, the stored information can be extracted. Optionally, in step 560, formatted reports can be generated from the stored information for display to the user.

Figure 6:
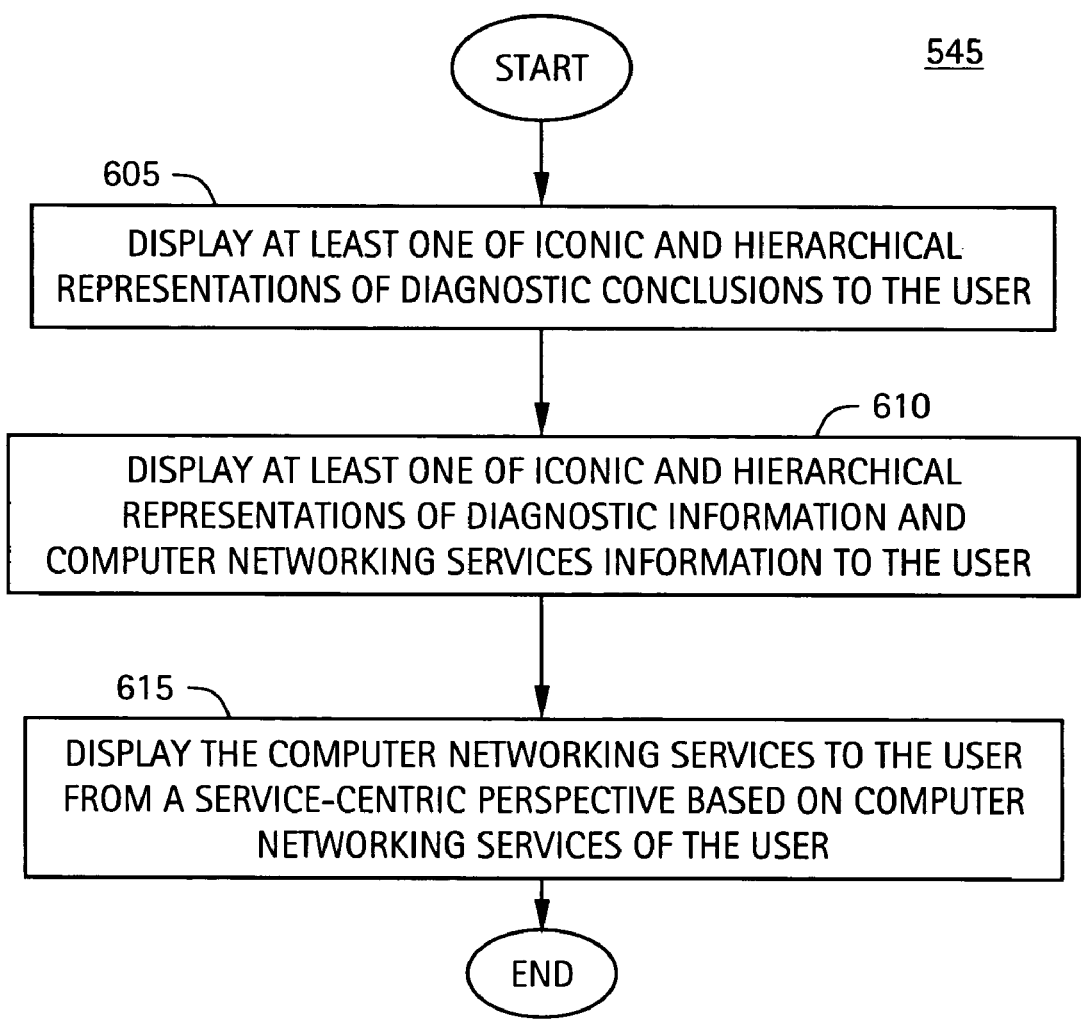
FIG. 6 is a flowchart illustrating steps for display format information to a user, in accordance with an exemplary embodiment of the present invention.

FIG. 6 is a flowchart illustrating steps for step 545 of FIG. 5 for displaying format information to a user, in accordance with an exemplary embodiment of the present invention. In step 605, at least one of iconic and hierarchical representations of diagnostic conclusions can be displayed to the user. In step 610, at least one of iconic and hierarchical representations of diagnostic information and computer networking services information can be displayed to the user. In step 615, the computer networking services can be displayed to the user from a service-centric perspective based on computer networking services of the user.

Any or all of the steps of a computer program as illustrated in FIGS. 5 and 6 for diagnosing impairments in computer networking services can be embodied in any suitable type of computer-readable medium for use by or in connection with an instruction execution system, apparatus, or device, such as a computer-based system, processor-containing system, or other system that can fetch the instructions from the instruction execution system, apparatus, or device and execute the instructions. As used herein, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium can include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM).

Exemplary embodiments of the present invention can be used to manage or otherwise diagnose computer networking services as a stand-alone management system or in connection with other network management/error management systems, particularly from a service-centric perspective and in a manner that does not inundate and overwhelm a user with large amounts of data.

It will be appreciated by those of ordinary skill in the art that the present invention can be embodied in various specific forms without departing from the spirit or essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

All United States patents and applications, foreign patents, and publications discussed above are hereby incorporated by reference herein in their entireties.

What is claimed is:

1. A system for diagnosing impairments in computer networking services, comprising:
   a plurality of connector gateways,
   wherein the plurality of connector gateways are configured in a computer network to interface to a plurality of data sources to provide access by the system to computer network data, business-related data, and extra-enterprise environmental data in the plurality of data sources;
   a knowledge manager in communication with each of the plurality of connector gateways,
   wherein the knowledge manager is configured to analyze data from the plurality of data sources to generate diagnostic conclusions for resolving the impairments in the computer networking services;
   a graphical user interface; and
   an interactor in communication with the knowledge manager,
   wherein the interactor is configured to generate format information for displaying at least the diagnostic conclusions to a user,
   wherein the knowledge manager comprises a plurality of rules engines,
   wherein at least one of accuracy and efficiency of the rules engines is altered to modify a time length for generating the diagnostic conclusions by the knowledge manager, and
   wherein the rules engines are locally or remotely distributed over the computer network to provide for distributed and parallel processing,
   wherein the knowledge manager comprises at least one diagnostic assistant,
   wherein the at least one diagnostic assistant is configured to collect data from the plurality of data sources via the plurality of connector gateways and to apply the collected data to the rules engines to generate the diagnostic conclusions, and wherein the diagnostic conclusions include locational as well as graphical representations of underlying data sources,
   wherein the graphical user interface is configured to display the format information from the interactor to the user,
   wherein the at least one diagnostic assistant comprises a plurality of graphical assistants, and
   wherein the graphical user interfaces displays a visual representation of a number of the graphical assistants that are currently active, as well as a percentage completion of a running diagnostic for each of the active graphical assistants.

2. The system of claim 1, wherein the diagnostic conclusions comprise a severity weighting factor for ranking the diagnostic conclusions.

3. The system of claim 1, wherein at least one event is associated with a diagnostic conclusion, and
   wherein the at least one event is configured to execute in response to the diagnostic conclusion.

4. The system of claim 1, wherein the graphical user interface is configured to display at least one of iconic and hierarchical representations of diagnostic conclusions to the user.

5. The system of claim 4, wherein the graphical user interface is configured to display at least one of iconic and hierarchical representations of diagnostic information and computer networking services information to the user.

6. The system of claim 1, wherein the graphical user interface is configured to display at least one of iconic and hierarchical representations of active diagnostic assistants to the user.

7. The system of claim 1, wherein the graphical user interface is configured to display the computer networking services to the user from a service-centric perspective based on computer networking services of the user.

8. The system of claim 1, comprising:
   at least one archival database in communication with the knowledge manager; and
   means for bounding a size of the archival database and for cleaning up logs associated with the archival database in order to make the archival database invisible to an end user.

9. The system of claim 8, wherein the at least one archival database is configured to store at least the diagnostic conclusions and information associated with the impairments of the computer networking services.

10. The system of claim 8, comprising:
a diagnostic report generator in communication with the at least one archival database and the interactor,
wherein the diagnostic report generator is configured to extract stored information from the at least one archival database and to generate formatted reports from the extracted information for display to the user.

11. The system of claim 1, wherein the knowledge manager is associated with a computer networking services domain.

12. The system of claim 1, wherein the computer network data comprises data from computer network test sources.

13. The system of claim 1, wherein the business-related data comprises data from customer records databases.

14. The system of claim 1, wherein the business-related data comprises data from network inventory databases.

15. The system of claim 1, wherein the extra-enterprise environmental data comprises news data associated with current events.

16. The system of claim 1, wherein the extra-enterprise environmental data comprises weather data.

17. The system of claim 1, wherein the plurality of rules engines comprises one or more base rules engines that provide basic required functions for a given domain, and one or more extended rules engines that provide value-added feature sets for the given domain, the system further comprising means for periodically migrating the added feature sets for the given domain to the one or more base rules engines.

18. The system of claim 1, further comprising output means, wherein the business-related data includes data on employees of a company for which the computer networking services is being used, and wherein when the diagnostic assistant generates the diagnostic conclusions indicating impairments with one or more components of the computer networking services, the diagnostic assistant retrieves the data on one or more employees of the company for which the one or more components are responsible, and notifies the one or more employees of the impairments via the output means.

19. The system of claim 18, wherein the diagnostic assistant notifies the one or more employees of the impairments via the output means in accordance with a predetermine sequence of notification, until one employee responds, and wherein once the one employee responds no other employees in the predetermined sequence are notified.

20. A system for diagnosing impairments in computer networking services, comprising:
a plurality of connector gateways,
wherein the plurality of connector gateways are configured in a computer network to interface to a plurality of data sources to provide access by the system to computer network data, business-related data, and extra-enterprise environmental data in the plurality of data sources;
a knowledge manager in communication with each of the plurality of connector gateways,
wherein the knowledge manager is configured to analyze data from the plurality of data sources to generate diagnostic conclusions for resolving the impairments in the computer networking services;
limiting means for limiting an amount of time that the rules engine can spend for analyzing the data; and
an interactor in communication with the knowledge manager,
wherein the interactor is configured to generate format information for displaying at least the diagnostic conclusions to a user,
wherein the knowledge manager comprises a plurality of rules engines,
wherein at least one of accuracy and efficiency of the rules engines is altered to modify a time length for generating the diagnostic conclusions by the knowledge manager,
wherein the rules engines are locally or remotely distributed over the computer network to provide for distributed and parallel processing, and
wherein a first rule to be executed by at least one of the plurality of rules engines is a rule that causes a stop of analyzing data by the knowledge manager after a predetermined period of time has elapsed since a start of analyzing data by the knowledge manager, and wherein a second rule to be executed by at least one of the plurality of rules engines is a rule that causes a stop of analyzing data by the knowledge manager after a predetermined amount of data has been analyzed by the knowledge manager.

* * * * *